(12) United States Patent
Gueron et al.

(10) Patent No.: US 10,476,667 B2
(45) Date of Patent: *Nov. 12, 2019

(54) SM4 ACCELERATION PROCESSORS, METHODS, SYSTEMS, AND INSTRUCTIONS

(71) Applicant: Intel Corporation, Santa Clara, CA (US)

(72) Inventors: Shay Gueron, Haifa (IL); Vlad Krasnov, Nesher (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,650

(22) Filed: Sep. 29, 2018

(65) Prior Publication Data
US 2019/0109705 A1    Apr. 11, 2019

Related U.S. Application Data

(63) Continuation of application No. 16/025,706, filed on Jul. 2, 2018, which is a continuation of application (Continued)

(51) Int. Cl.
*H04L 29/06* (2006.01)
*H04L 9/06* (2006.01)
(Continued)

(52) U.S. Cl.
CPC ........ *H04L 9/0637* (2013.01); *G06F 9/30007* (2013.01); *G06F 9/30036* (2013.01);
(Continued)

(58) Field of Classification Search
None
See application file for complete search history.

(56) References Cited

U.S. PATENT DOCUMENTS 6,604,158 B1 * 8/2003 Fallon .................. G06F 3/0608
  709/246
6,825,553 B2   11/2004 Chua et al.
(Continued)

FOREIGN PATENT DOCUMENTS

CN    101272238 A    9/2008
CN    101764684 A    6/2010
(Continued)

OTHER PUBLICATIONS

Communication pursuant to Article 94(3) EPC for Application No. 14194114.6, dated Dec. 6, 2018, 9 pages.
(Continued)

*Primary Examiner* — Andrew J Steinle
(74) *Attorney, Agent, or Firm* — NDWE, LLP

(57) ABSTRACT

A processor of an aspect includes a plurality of packed data registers, and a decode unit to decode an instruction. The instruction is to indicate one or more source packed data operands. The one or more source packed data operands are to have four 32-bit results of four prior SM4 cryptographic rounds, and four 32-bit values. The processor also includes an execution unit coupled with the decode unit and the plurality of the packed data registers. The execution unit, in response to the instruction, is to store four 32-bit results of four immediately subsequent and sequential SM4 cryptographic rounds in a destination storage location that is to be indicated by the instruction.

33 Claims, 16 Drawing Sheets

Related U.S. Application Data

No. 15/366,556, filed on Dec. 1, 2016, now Pat. No. 10,015,010, which is a continuation of application No. 14/337,999, filed on Jul. 22, 2014, now Pat. No. 9,513,913.

(51) Int. Cl.
  *G06F 9/30* (2018.01)
  *G06F 21/60* (2013.01)

(52) U.S. Cl.
  CPC ........ *G06F 9/30156* (2013.01); *G06F 21/602* (2013.01); *H04L 9/0625* (2013.01); *H04L 9/0631* (2013.01); *H04L 2209/12* (2013.01); *H04L 2209/24* (2013.01); *H04L 2209/80* (2013.01)

(56) References Cited

U.S. PATENT DOCUMENTS

| | | | |
|---|---|---|---|
| 6,925,553 B2* | 8/2005 | Roussel | G06F 9/30014 712/245 |
| 7,949,130 B2 | 5/2011 | Gueron et al. | |
| 8,391,475 B2 | 3/2013 | Gopal et al. | |
| 8,538,012 B2 | 9/2013 | Dixon et al. | |
| 8,538,015 B2 | 9/2013 | Gueron et al. | |
| 8,619,985 B2 | 12/2013 | Gebotys | |
| 9,361,106 B2 | 6/2016 | Wolrich et al. | |
| 9,467,279 B2 | 10/2016 | Wolrich et al. | |
| 9,503,256 B2 | 11/2016 | Yap et al. | |
| 9,544,133 B2 | 1/2017 | Mathew et al. | |
| 2006/0265563 A1* | 11/2006 | Goettfert | G06F 12/1408 711/164 |
| 2008/0240426 A1 | 10/2008 | Gueron et al. | |
| 2009/0204824 A1* | 8/2009 | Lin | G06F 12/0246 713/193 |
| 2009/0323930 A1* | 12/2009 | Lu | H04L 9/0625 380/28 |
| 2010/0046448 A1* | 2/2010 | Peisa | H04W 28/065 370/329 |
| 2011/0087895 A1 | 4/2011 | Olson et al. | |
| 2014/0185793 A1 | 7/2014 | Wolrich et al. | |
| 2014/0189368 A1 | 7/2014 | Wolrich et al. | |
| 2014/0195782 A1 | 7/2014 | Yap et al. | |
| 2015/0067302 A1 | 3/2015 | Gueron et al. | |
| 2015/0172043 A1 | 6/2015 | Li et al. | |
| 2015/0186138 A1 | 7/2015 | Wolrich et al. | |
| 2015/0186139 A1 | 7/2015 | Wolrich et al. | |
| 2015/0341168 A1 | 11/2015 | Gueron et al. | |
| 2016/0026468 A1 | 1/2016 | Gueron et al. | |
| 2016/0094340 A1 | 3/2016 | Wolrich et al. | |

FOREIGN PATENT DOCUMENTS

| | | | |
|---|---|---|---|
| CN | 101764685 | A | 6/2010 |
| CN | 103812641 | A | 5/2014 |
| EP | 2096787 | A2 | 9/2009 |
| TW | 201235938 | A | 9/2012 |
| TW | 201346747 | A | 11/2013 |
| WO | 2013072657 | A1 | 5/2013 |
| WO | 2017034601 | A1 | 3/2017 |

OTHER PUBLICATIONS

Third Office Action from foreign counterpart Chinese Patent Application No. 201510349232.2, dated Dec. 4, 2018, 7 pages.
Communication Pursuant to Rules 70(2) and 70a(2) EPC for Application No. 15902463.7, dated Apr. 11, 2019, 1 page.
Decision on rejection from foreign counterpart Chinese Patent Application No. 201510349232.2, dated Mar. 7, 2019, 12 pages.
Extended European Search Report for Application No. 15902463.7, dated Mar. 25, 2019, 12 pages.
Final Office Action received for U.S. Appl. No. 15/289,819, dated Nov. 30, 2017, 6 pages.
Intel, "Intel 64 and IA-32 Architectures Software Developer's Manual," Instruction Set Reference, A-Z, Order No. 325383-040US, vol. 2 (2A, 2B & 2C), Oct. 2011, 1721 pages.
Intel, "Intel 64 and IA-32 Architectures Software Developer's Manual," vol. 2 (2A and 2B): Instruction Set Reference, A-Z, Order No. 325383-039US, May 2011, 1643 Pages.
Intel, "Intel Advanced Vector Extensions Programming Reference," Document reference No. 319433-011, Jun. 2011, 595 pages.
International Preliminary Report on Patentability for Application No. PCT/US2015/065137, dated Mar. 8, 2018 , 8 pages.
International Search Report and Written Opinion received for PCT Application No. PCT/US2015/065137, dated Dec. 12, 2016, 11 pages.
Non-Final Office Action from U.S. Appl. No. 15/289,819, dated May 19, 2017, 12 pages.
Notice of Allowance from U.S. Appl. No. 16/025,706, dated Apr. 29, 2019, 24 pages.
Notice of Allowance and Search Report received for Taiwan Patent Application No. 105114570, dated Dec. 22, 2016, 4 pages of Taiwan Notice of Allowance including 1 page of English Translation of Search Report.
Notice of Allowance from U.S. Appl. No. 15/289,819, dated Aug. 8, 2018, 11 pages.
Notice of Allowance received for U.S. Appl. No. 14/498,633, dated Feb. 3, 2016, 8 pages.
Notice of Allowance received for U.S. Appl. No. 14/498,633, dated Jun. 10, 2016, 5 pages.
Notification of Reasons for Refusal from foreign counterpart Japanese Patent Application No. 2017-511158, dated May 15, 2018, 5 pages.
Search Report received for Taiwan Patent Application No. 104127515, dated Apr. 6, 2016, 1 page English Translation and 1 page of Taiwan Search Report.
Abandonment from U.S. Appl. No. 15/366,556, dated Mar. 2, 2018, 1 page.
Akdemir K., et al., "Breakthrough AES Performance with Intel AES New Instructions," Intel White Paper, Apr. 14, 2010, 12 Pages.
Babu M., et al., "Pipelined Sms4 Cipher Design for Fast Encryption Using Twisted BDDS-Box Architecture," retrieved from Web on Jul. 7, 2015, pp. 26-30.
Diffie W., et al., "SMS4 Encryption Algorithm for Wireless Networks," Translated and typeset by Whitfield Diffie of Sun Microsystems and George Ledin of Sonoma State University, Version 1.03, May 15, 2008, 6 Pages.
Extended European Search Report for Application No. 14194114.6, dated Dec. 19, 2017, 12 pages.
First Office Action and Search Report from foreign counterpart Chinese Patent Application No. 201510349232.2, dated Jan. 10, 2018, 29 pages (English translation available only for the office action).
Gueron S., "Intel® Advanced Encryption Standard (AES) Instructions Set," Intel White Paper, Sep. 2012, Revision 3.01, 94 pages.
Han L., et al., "A Programmable Security Processor for Cryptography Algorithms," 2008 9th International Conference on Solid-State and Integrated-Circuit Technology, Jan. 1, 2008, pp. 2144-2147.
Han L., et al., "A Programmable Security Processor for Cryptography Algorithms," 2008 9th International Conference on Solid-State and Integrated-Circuit Technology, Oct. 20, 2008, pp. 2144-2147.
Li Z., et al., "The Research and Application of a Specific Instruction Processor for SMS4," 2012 IEEE 11th International Conference on Trust, Security and Privacy in Computing and Communications, Jun. 1, 2012, pp. 1883-1888.
Li Z., et al., "The Research and Application of a Specific Instruction Processor for SMS4," 2012 IEEE 11th International Conference on Trust, Security and Privacy in Computing and Communications, Jun. 25, 2012, pp. 1883-1888.
Non-Final Office Action from U.S. Appl. No. 14/142,724, dated Jul. 1, 2015, 22 pages

(56) References Cited

OTHER PUBLICATIONS

Non-Final Office Action from U.S. Appl. No. 14/337,999, dated Dec. 11, 2015, 29 pages.
Non-Final Office Action from U.S. Appl. No. 15/366,556, dated Apr. 3, 2017, 22 pages.
Notice of Allowance from foreign counterpart Taiwan Patent Application No. 104119284, dated Oct. 28, 2016, 2 pages.
Notice of Allowance from U.S. Appl. No. 14/142,724, dated Feb. 11, 2016, 18 pages.
Notice of Allowance from U.S. Appl. No. 14/337,999, dated Aug. 3, 2016, 16 pages.
Notice of Allowance from U.S. Appl. No. 15/366,556, dated Nov. 15, 2017, 15 pages.
Office Action and Search Report from foreign counterpart Taiwan Patent Application No. 104119284, dated Apr. 21, 2016, 27 pages.
Second Office Action from foreign counterpart Chinese Patent Application No. 201510349232.2, dated May 29, 2018, 9 pages.

\* cited by examiner

FIG. 4
SM4 FOUR CIPHER ROUND OPERATION 430
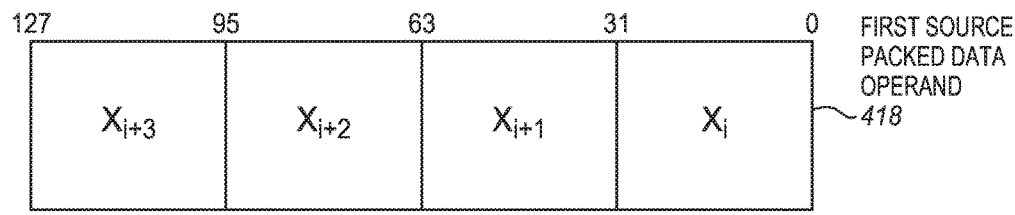
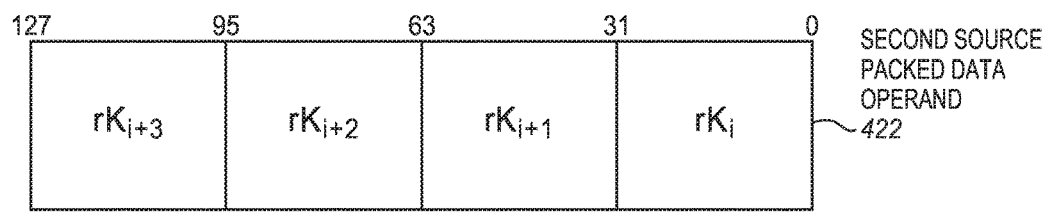
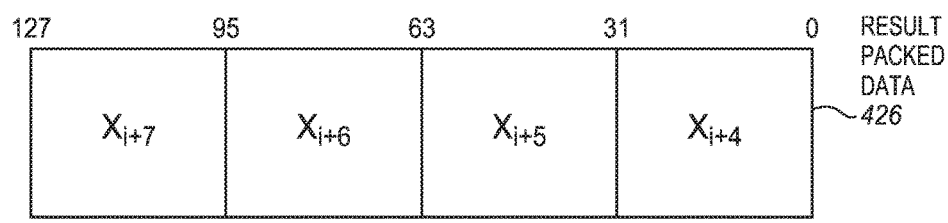

FIG. 5
SM4 FOUR KEY EXPANSION ROUND OPERATION 530
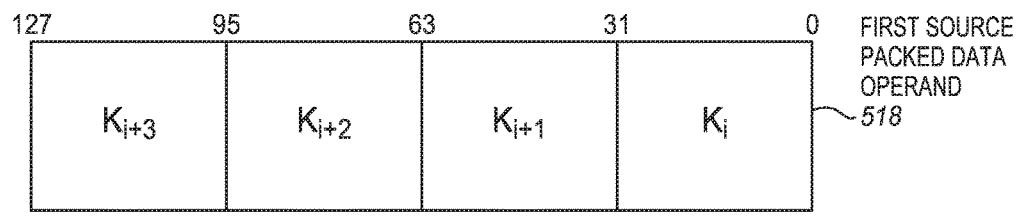
FIRST SOURCE PACKED DATA OPERAND 518
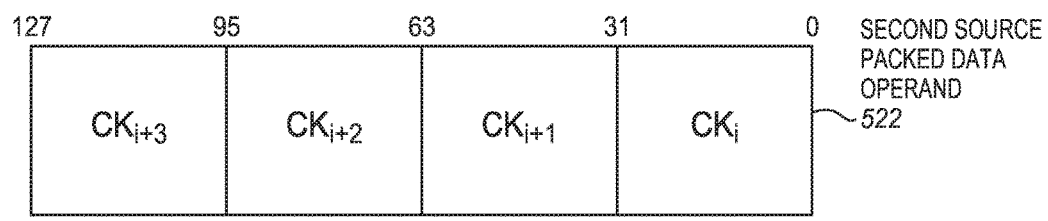
SECOND SOURCE PACKED DATA OPERAND 522
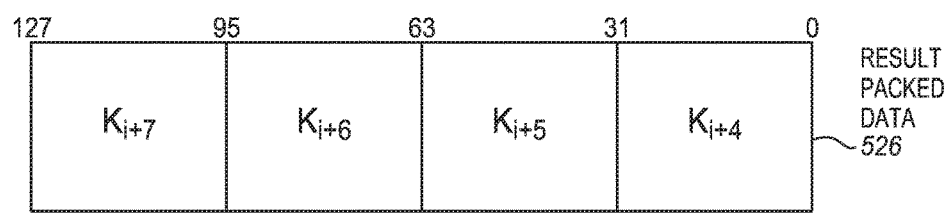
RESULT PACKED DATA 526

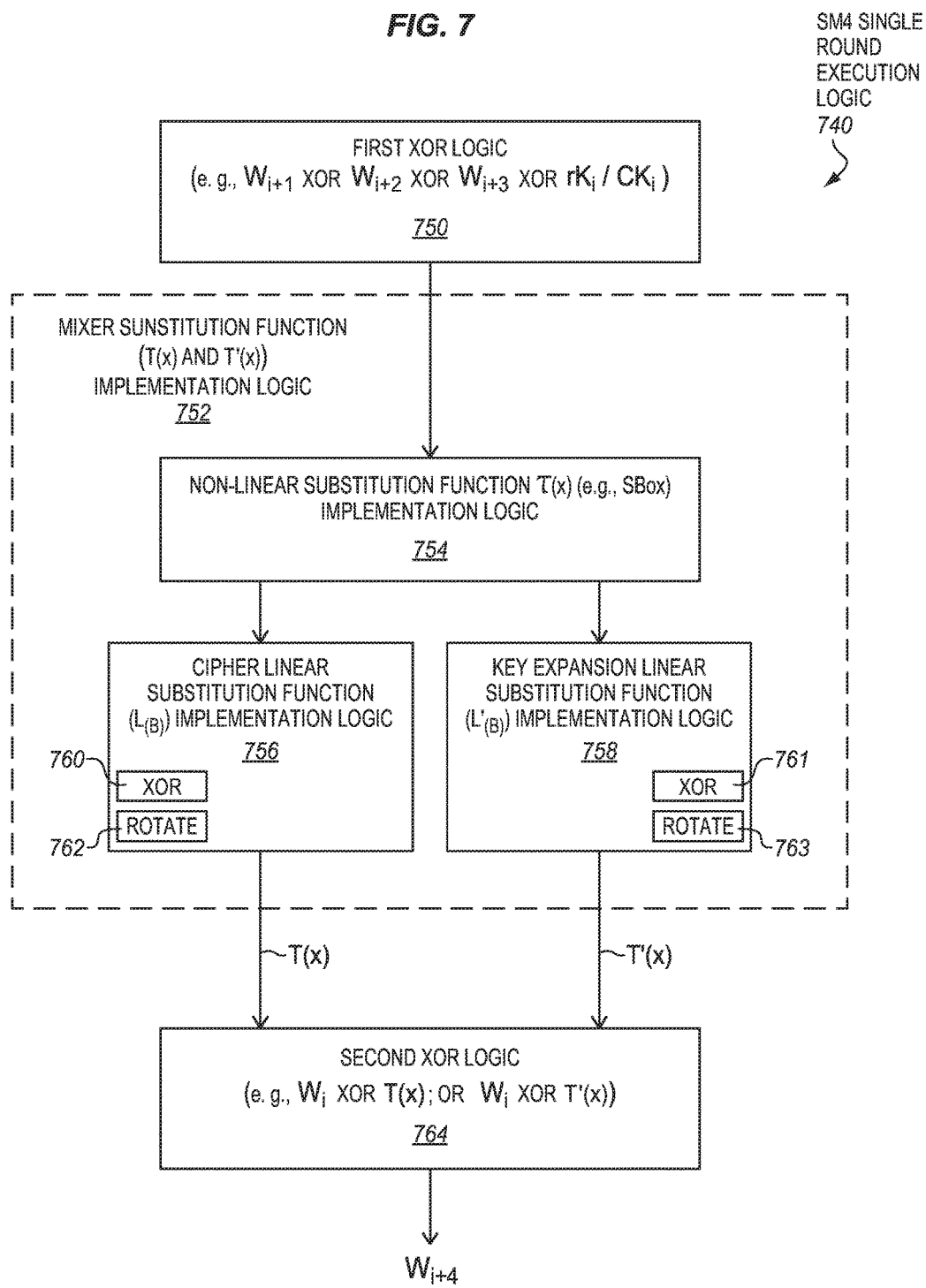

870 ─┐

| SM4 FOUR CIPHER ROUND OPCODE<br>871 | FIRST SOURCE SPECIFIER<br>874-1 | SECOND SOURCE SPECIFIER<br>876-1 | DESTINATION SPECIFIER (OPTIONAL)<br>878-1 |
|---|---|---|---|

872 ─┐

| SM4 FOUR KEY EXPANSION ROUND OPCODE<br>873 | FIRST SOURCE SPECIFIER<br>874-2 | SECOND SOURCE SPECIFIER<br>876-2 | DESTINATION SPECIFIER (OPTIONAL)<br>878-2 |
|---|---|---|---|

| SM4 FOUR ROUND OPCODE<br>881 | CIPHER OR KEY EXPANSION SELECTOR<br>882 | FIRST SOURCE SPECIFIER<br>874 | SECOND SOURCE SPECIFIER<br>876 | DESTINATION SPECIFIER (OPTIONAL)<br>878 |
|---|---|---|---|---|

*FIG. 8B*

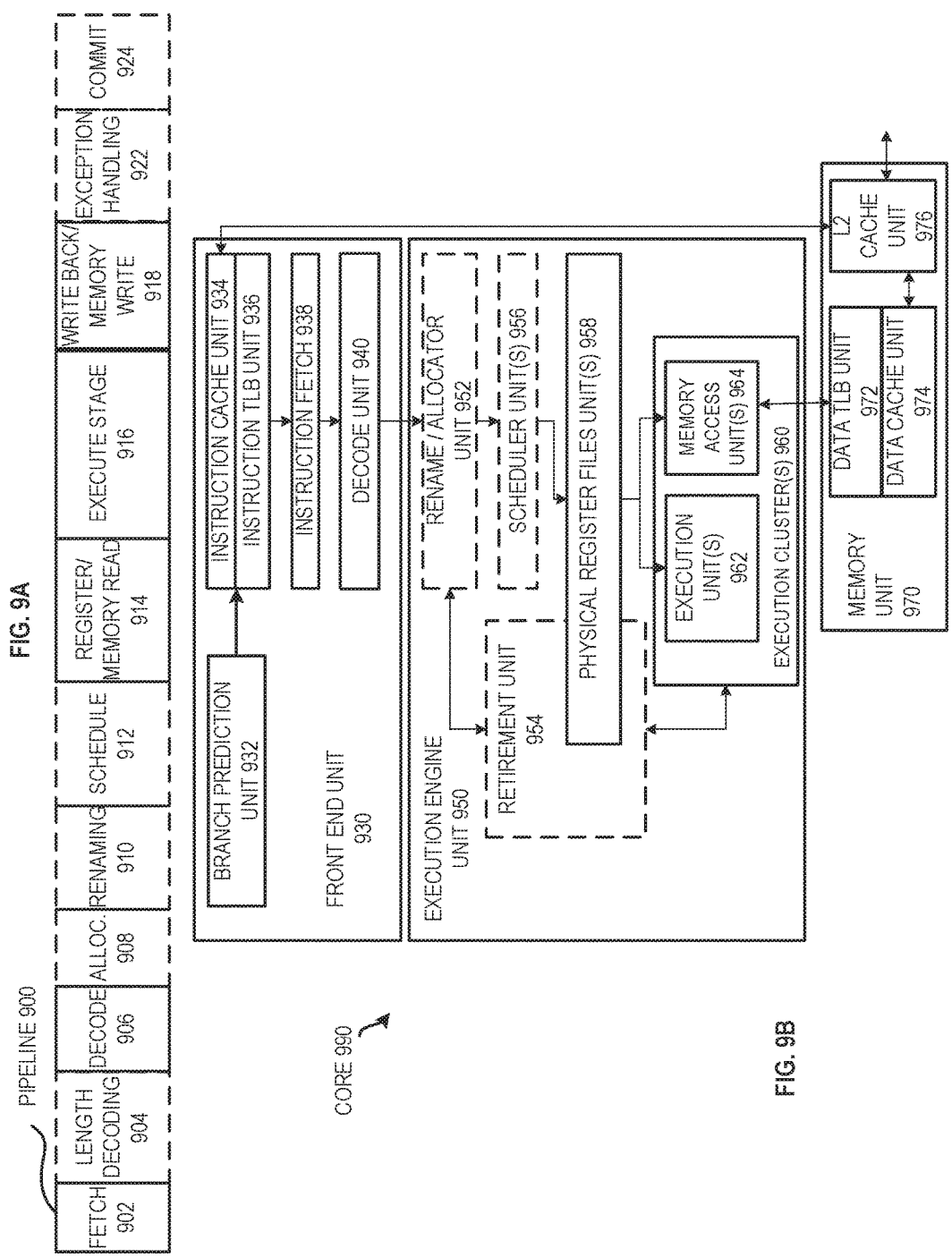

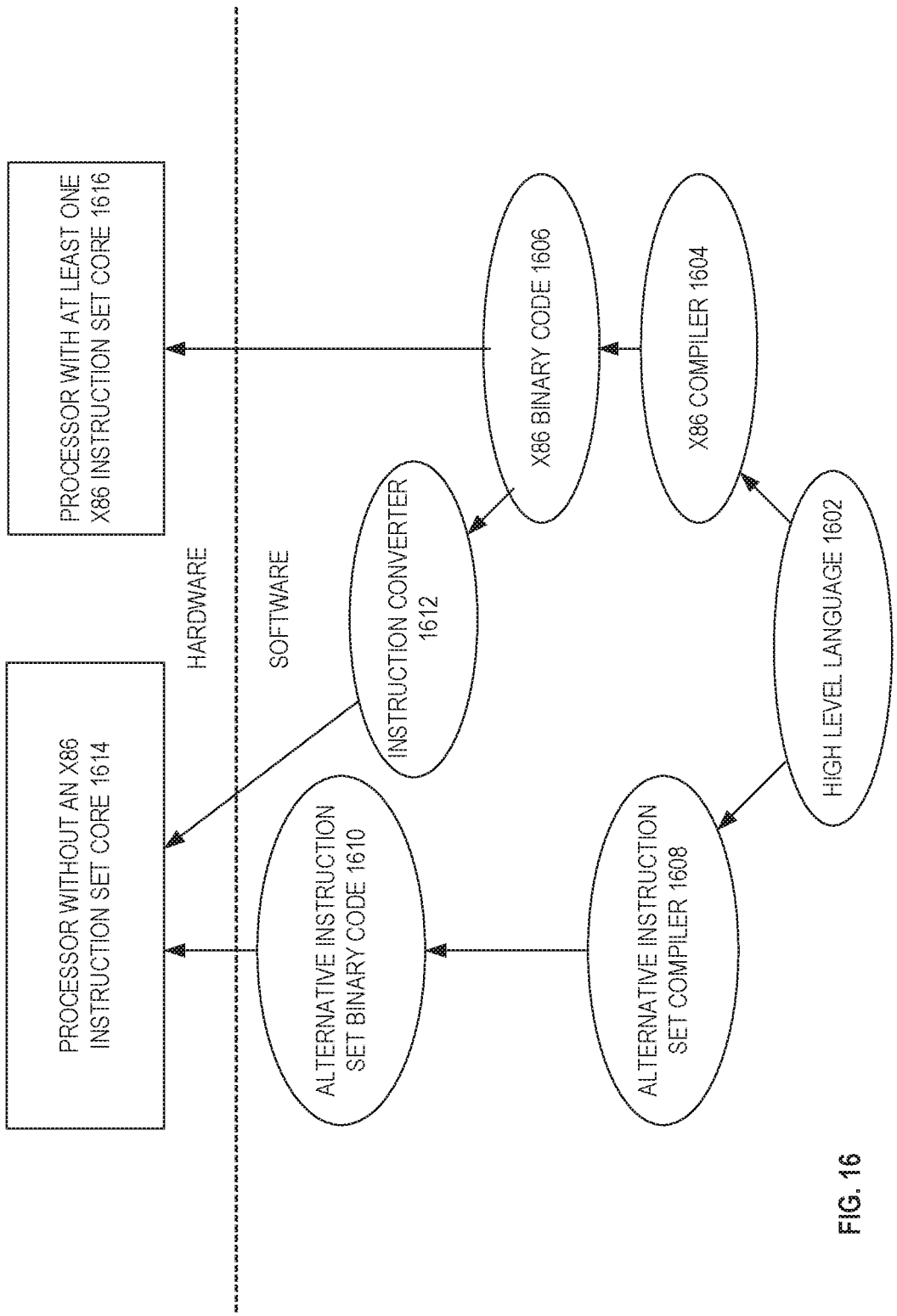

SM4 ACCELERATION PROCESSORS, METHODS, SYSTEMS, AND INSTRUCTIONS

RELATED APPLICATIONS

The present application is a continuation of U.S. patent application Ser. No. 16/025,706, filed on Jul. 2, 2018, entitled "SM4 ACCELERATION PROCESSORS, METHODS, SYSTEMS, AND INSTRUCTIONS", which is a continuation of U.S. patent application Ser. No. 15/366,556, filed on Dec. 1, 2016, entitled "SM4 ACCELERATION PROCESSORS, METHODS, SYSTEMS, AND INSTRUCTIONS", now U.S. Pat. No. 10,015,010, Issued on Jul. 3, 2018, which is continuation of U.S. patent application Ser. No. 14/337,999, filed on Jul. 22, 2014, entitled "SM4 ACCELERATION PROCESSORS, METHODS, SYSTEMS, AND INSTRUCTIONS", now U.S. Pat. No. 9,513,913, Issued on Dec. 6, 2016, which is hereby incorporated herein by reference in its entirety and for all purposes.

BACKGROUND

Technical Field

Embodiments described herein generally relate to processors. In particular, embodiments described herein generally relate to performing cryptography in processors.

Background Information

Cryptology is a technology often used to protect confidential or secret information in computer systems and other electronic devices. Cryptology generally involves using a cryptographic algorithm and a cryptographic key to protect the information. For example, encryption (sometimes referred to as cipher) may be performed in which a series of transformations or operations as specified by the cryptographic algorithm are performed on unencrypted or plaintext input data (e.g., a string of bits representing text, numbers, intelligible characters, etc.) using an encryption key (e.g., a string of bits) to produce encrypted data. The encrypted data is also sometimes referred to as cipher text or cipher data. The encrypted data is generally unintelligible. It is generally not possible, or at least not practically feasible, to determine the unencrypted plaintext data from the encrypted data, without knowing the cryptographic key. If the cryptographic key is known, decryption (sometimes referred to as inverse cipher) may be performed on the encrypted data to reproduce the corresponding plaintext or unencrypted data. The transformations or operations performed during decryption may be substantially the reverse of those performed during encryption.

SM4 is a cryptographic algorithm approved by the Chinese government for use in wireless networks. SM4 was formerly known as SMS4. The SM4 cryptographic algorithm is a block cipher algorithm. The input data (also referred to as state), output data, and cryptographic key are each 128-bits. Encryption of data is performed through thirty-two rounds. Each round involves a number of different operations or transformations that are used to transform the input data into the encrypted data. Thirty-two rounds with similar transformations are used to decrypt data. There are also thirty-two rounds for key expansion in which round keys for the different encryption and decryption rounds are generated. Further details of the SM4 cryptographic algorithm, if desired, are available in the document "SM4 Encryption Algorithm for Wireless Networks," translated and typeset by Whitfield Diffie of SUN MICROSYSTEMS Corporation and George Ledin of Sonoma State University, 15 May 2008, Version 1.03.

One challenge is that implementing the SM4 cryptographic algorithm generally tends to be computationally intensive. As a result, software implementations of the SM4 cryptographic algorithm generally tend to have poor performance. This poor performance is due at least in part to the large number of operations that need to be performed, and the correspondingly large number of instructions that need to be executed. Commonly, each single round may take from several to many instructions. Moreover, recall that thirty-two rounds are needed for each of encryption, decryption, and key expansion.

BRIEF DESCRIPTION OF THE DRAWINGS

The invention may best be understood by referring to the following description and accompanying drawings that are used to illustrate embodiments. In the drawings:

FIG. 4 is a block diagram of an embodiment of an SM4 four cipher round operation.

FIG. 5 is a block diagram of an embodiment of a SM4 four key expansion round operation.

FIG. 7 is a block diagram of an example embodiment of SM4 single round execution logic.

FIG. 8A is a block diagram of an embodiment of an instruction format for an SM4 four round cipher instruction and an instruction format for an SM4 four round key expansion instruction.

FIG. 8B is a block diagram of an embodiment of an instruction format for a single SM4 acceleration instruction to perform both four rounds of cipher and four rounds of key expansion.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

FIG. 16 is a block diagram of use of a software instruction converter to convert binary instructions in a source instruction set to binary instructions in a target instruction set, according to embodiments of the invention.

DETAILED DESCRIPTION OF EMBODIMENTS

Disclosed herein are SM4 acceleration instructions, processors to execute the instructions, methods performed by the processors when processing or executing the instructions, and systems incorporating one or more processors to process or execute the instructions. In the following description, numerous specific details are set forth (e.g., specific instruction operations, data formats, arrangements of data within operands, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
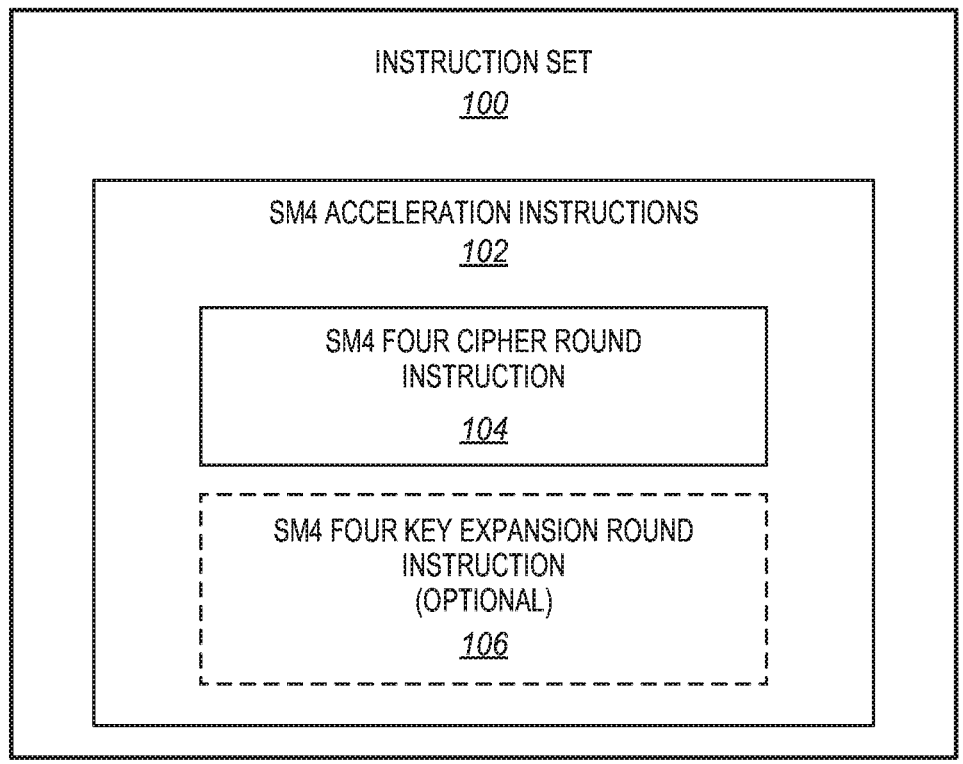
FIG. 1 is a block diagram of an embodiment of an instruction set that includes one or more SM4 acceleration instructions.

FIG. 1 is a block diagram of an instruction set 100 of a processor that includes one or more SM4 acceleration instructions 102. The SM4 acceleration instruction(s) may help to accelerate implementations of the SM4 cryptographic algorithm. The instruction set is part of the instruction set architecture (ISA) of the processor and includes the native instructions that the processor is operable to execute. The instructions of the instruction set represent macroinstructions, assembly language instructions, or machine-level instructions that are provided to the processor for execution. These instructions are contrasted to microinstructions, micro-ops, or other instructions that result from decoding the instructions of the instruction set.

In some embodiments, the SM4 acceleration instruction(s) 102 may include an SM4 four cipher round instruction 104. During cipher (e.g., encryption and decryption), the SM4 algorithm uses a round function (F). The round function (F) is shown in Equation 1:

$$X_{i+4} = F(X_i, X_{i+1}, X_{i+2}, X_{i+3}, rk_i) \quad \text{Equation 1}$$
$$= X_i \text{ XOR } T(X_{i+1} \text{ XOR } X_{i+2} \text{ XOR } X_{i+3} \text{ XOR } rk_i)$$

The symbol "XOR" represents a bitwise exclusive OR (XOR) operation that may be performed on these 32-bit values. The terms $X_i$ represents a 32-bit piece of state for round i, $X_{i+1}$ represents a 32-bit piece of state for round (i+1), etc. The term $rk_i$ represents a 32-bit round key for round i. Initially, a 128-bit input block (e.g., 128-bits of plaintext data to be encrypted) may be designated as four 32-bit elements ($X_0, X_1, X_2, X_3$). These elements may be arranged in big endian order. The round function (F) is used to perform thirty-two rounds (e.g., for i=0, 1, . . . 31). Representatively, during the first round, a 32-bit result $X_4$ may be determined by evaluating $F(X_0, X_1, X_2, X_3, rk_0)$. After thirty-two rounds of encryption, ($X_{28}, X_{29}, X_{30}, X_{31}$) represents 128-bits of encrypted data corresponding to the 128-bit input block ($X_0, X_1, X_2, X_3$).

Notice that Equation 1 has a function T(x). T(x) is known as the mixer-substitution function. T(x) generates a 32-bit output from a 32-bit input. As shown in Equation 2, the mixer-substitution function T(x) includes two substitution functions:

$$T(x)=L(\tau(x)) \quad \text{Equation 2}$$

The function τ(x) is a "non-linear substitution" function. The function L(B) is a "linear substitution" function.

Equation 3 represents the operation of the non-linear substitution function τ(x):

$$\tau(x)=(Sbox(a_0),Sbox(a_1),Sbox(a_2),Sbox(a_3)) \quad \text{Equation 3}$$

τ(x) applies a substitution box (Sbox) to a 32-bit input value x. The 32-bit value x may be logically partitioned into four 8-bit segments or bytes $a_0, a_1, a_2,$ and $a_3$. Each of $a_0, a_1, a_2,$ and $a_3$ may be passed through the Sbox. The Sbox may take the associated 8-bit segment as an input, perform a non-linear substitution on the input 8-bit segment to generate a replacement or substitute 8-bit segment, and output the replacement or substitute 8-bit segment. By way of example, the Sbox may be implemented as a fixed lookup table. The input 8-bit segment may be used to lookup the corresponding output 8-bit segment in the lookup table. For example, one part of the input 8-bit segment may select a row, another part of the input 8-bit segment may select a column, and the selected row and selected column may identify a byte to be used as the output byte. The four output 8-bit segments may be concatenated to produce a 32-bit value B. The 32-bit value B may represent four concatenated 8-bit segments ($b_0, b_1, b_2, b_3$). The relation between B and τ(x) is shown by Equation 4:

$$B=(b_0,b_1,b_2,b_3)=\tau(x) \quad \text{Equation 4}$$

As shown in Equation 2, the linear substitution function L(B) may be performed on the 32-bit result B of the non-linear substitution function τ(x). The linear substitution function L(B), which is used for encryption and/or decryption, is shown in Equation 5:

$$L(B)=B\text{XOR}(B<<<2)\text{XOR}(B<<<10)\text{XOR}(B<<<18)$$
$$\text{XOR}(B<<<24) \quad \text{Equation 5}$$

The symbol "<<<i" represents a left rotate or "circular shift" of a 32-bit value by i-bits. For example, B<<<18 represents a left rotate of B by 18 bits.

During encryption, the round function (F) as represented by Equation 1 (e.g., including the mixer-substitution function T(x) having the non-linear substitution function τ(x) given by Equation 3 and the linear substitution function L(B) given by Equation 5) may be performed during each of thirty-two rounds (i=0, 1, . . . 31). After these thirty-two rounds, the encrypted or ciphertext value of the plaintext 128-bit input block ($X_0, X_1, X_2, X_3$) may be designated as ($Y_0, Y_1, Y_2, Y_3$). ($Y_0, Y_1, Y_2, Y_3$) is equal to the reverse substitution of ($X_{32}, X_{33}, X_{34}, X_{35}$) which may be designated as ($X_{35}, X_{34}, X_{33}, X_{32}$).

During decryption, a block may be decrypted by using the same round function (F) represented by Equation 1 (e.g., including the mixer-substitution function T(x) having the non-linear substitution function τ(x) given by Equation 3 and the linear substitution function L(B) given by Equation 5) but reversing the order is which the round keys ($rk_i$) are used. That is, the algorithm's encryption and decryption performs substantially the same operations, except that the order in which the round keys are used is reversed. For example, the key order for encryption may be first $rk_0$, then $rk_1, \ldots,$ and finally $rk_{31}$, whereas the key order for decryption may be first $rk_{31}$, then $rk_{30}, \ldots,$ and finally $rk_0$.

In some embodiments, the SM4 four cipher round instruction may evaluate all, or at least substantially all, of four cipher (e.g., encryption or decryption) rounds to generate four single-round results that each correspond to a different single sequential cipher round. For example, in some embodiments, during each of the four rounds, the SM4 four cipher round instruction may evaluate all, or at least substantially all, of Equations 1-5. For example, in some embodiments, during each of the four rounds, the SM4 four cipher round instruction may evaluate all, or at least substantially all, of the four XOR operations given by Equation 1, the non-linear substitution function τ(x) given by Equation 3 (e.g., including the Sbox lookups), the four XORs and four left rotates of the linear substitution function L(B) given by Equation 5. It is to be appreciated that, in some embodiments, certain of these operations may optionally be performed outside of the confines of the SM4 four cipher round instruction (e.g., some XOR or rotate operations may be performed outside of the instruction with an intermediate result being provided as input), although generally performance may be improved by at least a majority (i.e., more than 50%), at least a vast majority (i.e., more than 80%), substantially all (e.g. at least 95%), or all of these operations within the confines of the SM4 four cipher round instruction.

Referring again to FIG. 1, in some embodiments, the SM4 acceleration instruction(s) 102 may include an optional SM4 four key expansion round instruction 106, although this is not required. Another part of the SM4 algorithm is key expansion or generation. During key expansion, round keys or expanded keys, which are needed as input to the cipher (e.g., encryption and/or decryption) rounds (e.g., input to the F function represented by Equation 1), are generated.

Thirty-two round keys ($rk_0$, $rk_1$, ... $rk_{31}$) may be generated from a 128-bit encryption key "MK", a 128 bit system parameter "FK", and thirty-two key generation constants ($CK_0$, $CK_1$, ... $CK_{31}$) defined by the algorithm. The 128-bit encryption key MK may be represented as four 32-bit segments ($MK_0$, $MK_1$, $MK_2$, $MK_3$). The system parameter FK may be represented as four 32-bit system parameter segments ($FK_0$, $FK_1$, $FK_2$, $FK_3$). In hexadecimal notation, these system parameter segments may be $FK_0$=(a3b1bac6), $FK_1$=(56aa3350), $FK_2$=(677d9197), and $FK_3$=(b27022dc). Initially, four 32-bit segments ($K_0$, $K_1$, $K_2$, $K_3$) may calculated according to Equation 6:

$$(K_0, K_1, K_2, K_3) = (MK_0 \text{XOR} FK_0, MK_1 \text{XOR} FK_1, MK_2 \text{XOR} FK_2, MK_3 \text{XOR} FK_3)$$  Equation 6

The thirty-two round keys ($rk_i$) may be generated according to the key expansion round function (F') represented by Equation 7:

$$\begin{aligned} rk_i &= K_{i+4} \\ &= F'(K_i, K_{i+1}, K_{i+2}, K_{i+3}, CK_i) \\ &= K_i \text{ XOR } T'(K_{i+1} \text{ XOR } K_{i+2} \text{ XOR } K_{i+3} \text{ XOR } CK_i) \end{aligned}$$  Equation 7

Equation 7 may be evaluated once to generate a single result of one round of key expansion (e.g., a round key $rk_i$). The key expansion round function (F') of Equation 7 is similar to the cipher round function (F) of Equation 1. One exception is that the key expansion round function (F') of Equation 7 has a slightly different mixer-substitution function T'(x) than the mixer-substitution function T(x) of the cipher round function (F) of Equation 1. In particular, the key expansion mixer-substitution function T'(x) uses a key expansion linear substitution function L'(B) that is different than the cipher linear substitution function L(B) of Equation 5. The key expansion linear substitution function L'(B) is shown in Equation 8:

$$L'(B) = B \text{XOR}(B<<<13) \text{XOR}(B<<<23)$$  Equation 8

As can be seen, by comparing Equation 5 with Equation 8, the key expansion linear substitution function L'(B) uses different rotation amounts, has two fewer XOR operations, and has two fewer rotation operations, as compared to the cipher linear substitution function L(B) of Equation 5.

In some embodiments, the SM4 four key expansion round instruction may evaluate all, or at least substantially all, of four key expansion rounds to generate four round keys or expanded keys that each correspond to a different single sequential key expansion round. For example, in some embodiments, during each of the four rounds, the SM4 four cipher round instruction may evaluate all, or at least substantially all, of Equations 7, 2-4, and 8. For example, in some embodiments, during each of the four rounds, the SM4 four cipher round instruction may evaluate all, or at least substantially all, of the four XOR operations given by Equation 7, may evaluate all, or at least substantially all, of the non-linear substitution function τ(x) given by Equation 3 (e.g., including the Sbox lookups), and may evaluate all, or at least substantially all, of the two XORs and two left rotates of the linear substitution function L'(B) given by Equation 8. It is to be appreciated that, in some embodiments, certain of these operations may optionally be performed outside of the confines of the SM4 four key expansion round instruction (e.g., some XOR or rotate operations may be performed outside of the instruction with an intermediate result being provided as input), although generally performance may be improved by at least a majority (i.e., more than 50%), at least a vast majority (i.e., more than 80%), substantially all (e.g. at least 95%), or all of these operations within the confines of the SM4 four key expansion round instruction.

Figure 2:
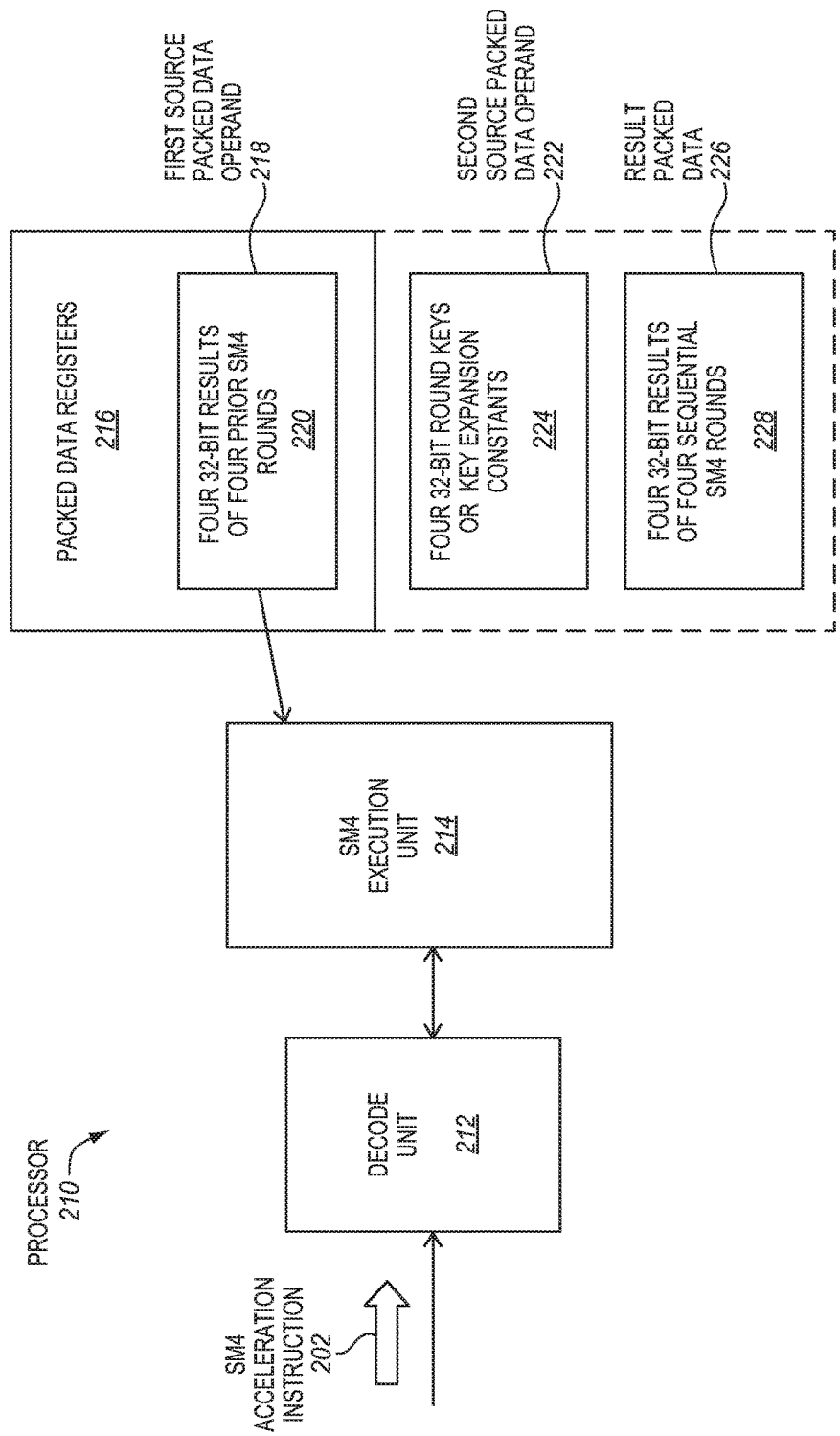
FIG. 2 is a block diagram of an embodiment of a processor that is operable to perform an embodiment of SM4 acceleration instruction.

FIG. 2 is a block diagram of an embodiment of a processor 210 that is operable to perform an embodiment of SM4 acceleration instruction 202. In some embodiments, the processor may be a general-purpose processor (e.g., a central processing unit (CPU) or other general-purpose processor of the type commonly used in desktop, laptop, or other computers). In one aspect, using an instruction of a general-purpose processor may help to avoid the need to use dedicated cryptographic special-purpose hardware, such as, for example, a field programmable gate array (FPGA) or application specific integrated circuit (ASIC), which would tend to add cost, power consumption and/or size to the implementation. Alternatively, the processor may be a special-purpose processor. Examples of suitable special-purpose processors include, but are not limited to, cryptographic processors, cryptographic co-processors, communications processors, network processors, graphics processors, co-processors, embedded processors, digital signal processors (DSPs), to name just a few examples. The processor may be any of various complex instruction set computing (CISC) processors, various reduced instruction set computing (RISC) processors, various very long instruction word (VLIW) processors, various hybrids thereof, may have a combination of different instruction sets (e.g., in different cores), or other types of processors.

During operation, the processor 210 may receive the SM4 acceleration instruction 202. In some embodiments, the SM4 acceleration instruction may be an SM4 four cipher round instruction (e.g., instruction 104), or in other embodiments an SM4 four key expansion round instruction (e.g., instruction 106). The SM4 acceleration instruction may be received from an instruction fetch unit, an instruction queue, or the like. The SM4 acceleration instruction may represent a macroinstruction, assembly language instruction, machine code instruction, or other instruction or control signal of an instruction set of the processor.

In some embodiments, the SM4 acceleration instruction may explicitly specify (e.g., through one or more fields or a set of bits), or otherwise indicate (e.g., implicitly indicate), one or more source packed data operands 118,122. In some embodiments, the one or more source packed data operands may have four 32-bit results 120 (e.g., $W_i$, $W_{i+1}$, $W_{i+2}$, $W_{i+3}$) of four prior SM4 cipher or key expansion rounds (e.g., i, i+1, i+2, i+3). As used herein, the notation W (e.g., $W_i$, $W_{i+1}$, etc.) is used herein to generically represent either a 32-bit result of a cipher round (e.g., $X_i$, $X_{i+1}$, etc.) or a 32-bit result of a key expansion round (e.g., $K_i$, $K_{i+1}$, etc.). By way of example, in the case of encryption, the four 32-bit results 220 may represent four results of four prior evaluations of the round function (F) as expressed by Equation 1 (e.g., $X_i$, $X_{i+1}$, $X_{i+2}$, and $X_{i+3}$) in four immediately prior rounds (e.g., i, i+1, i+2, and i+3). These four results may represent intermediate state being encrypted or decrypted. Alternatively, in the case of key expansion, the four 32-bit results 220 may represent four results of four prior evaluations of the round function (F') as expressed by Equation 7 (e.g., $K_i$, $K_{i+i}$, $K_{i+2}$, and $K_{i+3}$) in four immediately prior rounds (e.g., i, i+1, i+2, and i+3). Except for the initial four segments (i.e., $K_0$, $K_1$, $K_2$, $K_3$) these may represent four prior round keys. Recall that the key expansion round function (F') uses the key expansion linear substitution function L'(x), which is slightly different than the cipher linear function L(x) used by the cipher round function (F).

Referring again to FIG. 2, the one or more source operands 118, 122 may also have four 32-bit values 224. In the case of cipher, the four 32-bit values 224 may represent four 32-bit round keys for four prior rounds (e.g., $rK_i$, $rK_{i+1}$, $rK_{i+2}$, and $rK_{i+3}$). These four round keys may be used as input to four sequential evaluations of the cipher round function (F) as expressed by Equation 1. Alternatively, in the case of key expansion, the four 32-bit values may represent four 32-bit key generation constants (e.g., $CK_i$, $CK_{i+1}$, $CK_{i+2}$, $CK_{i+3}$). Recall that the SM4 algorithm defines thirty-two key generation constants $CK_0$-$CK_{31}$ for use in key expansion. These four key generation constants may be used as input to four sequential evaluations of the key generation round function (F') as expressed by Equation 7.

As shown, in some embodiments, the four 32-bit results 220 of the four prior SM4 rounds may optionally be stored in a first source packed data operand 218, although this is not required. As further shown, in some embodiments, the four 32-bit values 224 (e.g., the four 32-bit round keys for four prior rounds or the four 32-bit key generation constants) may optionally be stored in the second source packed data operand 222, although this is not required. Storing all of these same-type data elements within the same packed data operand may tend to offer certain efficiencies or advantages from an overall algorithmic perspective. For example, this may help to facilitate efficient management of these data elements from one round of the algorithm to the next and/or may help to reduce the number of packing and/or unpacking or like data rearrangement operations. Alternatively, in other embodiments, the four 32-bit results 220 and the four 32-bit values 224 may be rearranged variously within the one or more source operands. For example, all eight of these 32-bit values may be provided, and rearranged variously within, two 128-bit source packed data operands (e.g., each of the first and second source packed data operands 218, 222 may include a mixture of 32-bit results of prior rounds 220 and 32-bit values 224). As another example, a single 256-bit source packed data operand (not shown) may be used to provide all eight of these 32-bit values. In still other examples, memory locations, general-purpose registers, or other storage locations may optionally be used to provide one or more of these data elements. Although there are certain efficiencies or advantages to certain arrangements, as long as these eight 32-bit values are provided in some way through one or more source operands, various different rearrangements are possible. In some embodiments, the first and second source packed data operands 218, 222 may optionally include the information as shown or described for any of FIGS. 4-5, although the scope of the invention is not so limited.

Referring again to FIG. 2, the processor includes a decode unit or decoder 212. The decode unit may receive and decode the SM4 acceleration instruction. The decode unit may output one or more microinstructions, micro-operations, micro-code entry points, decoded instructions or control signals, or other relatively lower-level instructions or control signals that reflect, represent, and/or are derived from the SM4 acceleration instruction. The one or more relatively lower-level instructions or control signals may implement the relatively higher-level SM4 acceleration instruction through one or more relatively lower-level (e.g., circuit-level or hardware-level) operations. In some embodiments, the decode unit may include one or more input structures (e.g., port(s), interconnect(s), an interface) to receive the instruction, an instruction recognition and decode logic coupled with the input structure(s) to recognize and decode the instruction into the one or more corresponding lower-level instructions or control signals, and one or more output structures (e.g., port(s), interconnect(s), an interface) coupled with the recognition and decode logic to output the one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

The processor 210 also includes a set of packed data registers 216. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. In some embodiments, the first source packed data operand 218 and/or the four 32-bit results 220 of the four immediately prior rounds may optionally be stored in a first packed data register. In some embodiments, the second source packed data operand 222 and/or the four 32-bit values 224 (e.g., the four 32-bit round keys) may optionally be stored in a second packed data register. Alternatively, memory locations, or other storage locations, may optionally be used. The packed data registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

Referring again to FIG. 2, an SM4 execution unit 214 is coupled with the decode unit 212 and the packed data registers 216. For simplicity, the SM4 execution unit may also be referred to herein simply as an execution unit. The execution unit may receive the one or more decoded or otherwise converted instructions or control signals that represent and/or are derived from the SM4 acceleration instruction 202. The execution unit may also receive the four 32-bit results 220 of four prior SM4 rounds, and the four 32-bit values 224 (e.g., the four 32-bit round keys). The execution unit may be operable in response to and/or as a result of the SM4 acceleration instruction (e.g., in response to one or more instructions or control signals decoded from the instruction) to store a result packed data 226 that includes four 32-bit results 228 of four immediately subsequent and sequential SM4 rounds. The four immediately subsequent and sequential rounds may immediately follow the four rounds corresponding to the four input 32-bit values 220, and may be sequential or consecutive with one another. In the case of cipher, the four 32-bit results 228 may represent the results of four sequential evaluations of the cipher round function (F) as expressed by Equation 1 (e.g., the four results $X_{i+4}$, $X_{i+5}$, $X_{i+6}$, $X_{i+7}$ may be generated when $X_i$, $X_{i+1}$, $X_{i+2}$, $X_{i+3}$ reside in the first source packed data operand 218). Alternatively, in the case of key expansion, the four 32-bit results 228 may represent the results of four sequential evaluations of the key expansion round function (F') as expressed by Equation 7 (e.g., the four results $rK_i$, $rK_{i+1}$, $rK_{i+2}$, $rK_{i+3}$ may be generated when $K_i$, $K_{i+i}$, $K_{i+2}$, $K_{i+3}$ reside in the first source packed data operand 218). In some embodiments, the execution unit may store a result that may include any of those of shown or described for FIGS. 4-5, or other results described herein, although the scope of the invention is not so limited.

In some embodiments, the result packed data 226 may be stored in a destination storage location that may be explicitly specified or otherwise indicated (e.g., implicitly indicated) by the instruction. By way of example, the destination storage location may be a packed data register, a memory location, a general-purpose register, or other storage location. In some embodiments, the destination storage location may optionally be a same storage location (e.g., a packed data register) as was used for a source operand, although this is not required. For example, the instruction may implicitly indicated that the storage location specified for a source packed data operand (e.g., first source packed data operand 218) be implicitly also used as a destination storage location. The result packed data 226 may overwrite a source packed data (e.g., first source packed data operand 218) initially stored in the storage location. Alternatively, different storage locations may optionally be used for the source and result packed data operands.

The SM4 execution unit and/or the processor may include specific or particular cryptographic circuitry or other logic (e.g., transistors, integrated circuitry, or other hardware potentially combined with firmware (e.g., instructions stored in non-volatile memory) and/or software) that is operable to perform the SM4 acceleration instruction and/or store the result in response to the SM4 acceleration instruction (e.g., in response to one or more instructions or control signals decoded from the SM4 acceleration instruction). In some embodiments, the execution unit may include any of the cryptographic hardware, circuitry, or other logic shown or described for any of FIGS. 6-7 and/or capable of performing any of Equations 1-7.

Advantageously, the SM4 acceleration instruction 202 may help to significantly increase the speed, efficiency, and/or performance of implementing the SM4 algorithm. This may be due in part to replacing a high instruction count and complexity that would otherwise be provided by conventional software approaches involving a relatively large number of instructions with single instructions and logic of the processor responsive thereto.

To avoid obscuring the description, a simplified processor 210 has been shown and described. The processor may optionally include any of the other components shown and/or described for processors elsewhere herein. Embodiments may be included in processors have multiple cores, logical processors, or execution engines, at least one of which is able to perform an embodiment of a SM4 acceleration instruction.

Figure 3:
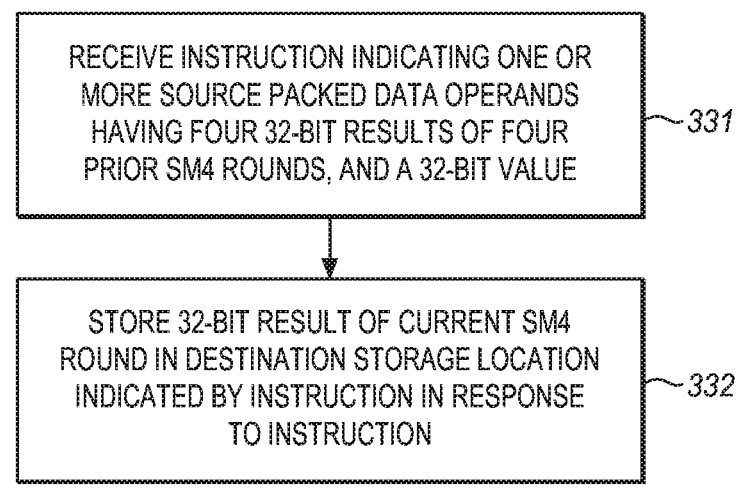
FIG. 3 is a block flow diagram of an embodiment of a method of performing an embodiment of a SM4 acceleration instruction.

FIG. 3 is a block flow diagram of an embodiment of a method 330 of performing an embodiment of a SM4 acceleration instruction. In various embodiments, the method may be performed by a processor, instruction processing apparatus, or other digital logic device. In some embodiments, the operations and/or method of FIG. 3 may be performed by and/or within the processor of FIG. 2. The components, features, and specific optional details described herein for the processor of FIG. 2 also optionally apply to the operations and/or method of FIG. 3. Alternatively, the operations and/or method of FIG. 3 may be performed by and/or within a similar or different processor or apparatus. Moreover, the processor of FIG. 2 may perform operations and/or methods the same as, similar to, or different than those of FIG. 3.

The method includes receiving the SM4 acceleration instruction, at block 331. In various aspects, the instruction may be received at a processor from an off-die source (e.g., from memory, an interconnect, etc.), or at a portion of a processor (e.g., from an instruction cache, an instruction queue, etc.) from an on-die source. The SM4 acceleration instruction may specify or otherwise indicate one or more source packed data operands. The one or more source packed data operands may have four 32-bit results (e.g., $W_i$, $W_{i+1}$, $W_{i+2}$, $W_{i+3}$) of four prior SM4 rounds (e.g., i, i+1, i+2, i+3), and four 32-bit values (e.g., in the case of cipher four 32-bit round keys $rK_i$, $rK_{i+1}$, $rK_{i+2}$, $rK_{i+3}$, or in the case of key expansion four key generation constants $CK_i$, $CK_{i+1}$, $CK_{i+2}$, $CK_{i+3}$).

Four 32-bit results of four immediately subsequent and sequential SM4 rounds may be stored in a destination storage location in response to the instruction, at block 226. The four immediately subsequent and sequential rounds may immediately follow the four rounds corresponding to the four 32-bit results (e.g., $W_i$, $W_{i+1}$, $W_{i+2}$, $W_{i+3}$) of four prior SM4 rounds provided in the source packed data operand(s), and may be sequential or consecutive with one another. The sequential SM4 rounds immediately follow the four prior SM4 rounds corresponding to the source operand. The destination storage location may be explicitly specified or otherwise indicated (e.g., implicitly indicted) by the instruction. Representatively, an execution unit, instruction processing apparatus, or processor may perform the instruction and store the result. In some embodiments, the sources and/or result may be any of those shown or described for any of FIGS. 4-5, or other results described elsewhere herein.

The illustrated method involves architectural operations (e.g., those visible from a software perspective). In other embodiments, the method may optionally include one or more microarchitectural operations. By way of example, the instruction may be fetched, decoded, source operands may be accessed, an execution unit may perform microarchitectural operations to implement the instruction, etc. In some embodiments, the method may optionally include evaluating an (F) function (for cipher), evaluating an (F') function (for key expansion), performing Sbox lookups, performing XOR operations, performing rotate operations, etc. In some embodiments, the method may optionally include any of the operations shown or described for any of FIGS. 4-7 or Equations 1-8.

FIG. 4 is a block diagram illustrating an embodiment of an SM4 four cipher round operation 430 that may be performed in response to an embodiment of a SM4 four cipher round instruction. In one aspect, the four cipher rounds may be encryption rounds. In another aspect, the four cipher rounds may be decryption rounds. In some embodiments, the same instruction may be used for both encryption and decryption with the main difference being that the order in which the round keys are used is reversed between encryption and decryption. To reverse the keys, the keys may either be stored in reverse order, or shuffle or permute type instructions may be used on the same key schedule "on the fly" to reverse the order.

The instruction may specify or otherwise indicate a first source packed data operand 418 and may specify or otherwise indicate a second source packed data operand 422. In various embodiments, the source packed data operands may be stored in packed data registers, memory locations, or other storage locations. In some embodiments the instruction may indicate as source operands only these two source operands. Alternatively, fewer or more source operands may be used to provide the same data (e.g., one 256-bit register, four 64-bit registers, etc.). In the illustrated embodiment, each of the first and second source packed data operands is a 128-bit operand having four 32-bit data elements. In the description of the SM4 algorithm, these 32-bit data elements are referred to as "words."

In the illustrated embodiment, the first source packed data operand 418 optionally has four 32-bit results of four prior SM4 encryption or decryption rounds, which are labeled $X_i$, $X_{i+1}$, $X_{i+2}$, and $X_{i+3}$. Including all four 32-bit results of the four prior SM4 encryption or decryption rounds in the same source packed data operand may offer certain efficiencies and/or advantages from an overall algorithmic perspective (e.g., by reducing the number of data manipulation operations needed to prepare data for subsequent rounds), but is not required. In other embodiments, these four 32-bit results may be provided in two or more source operands, may be mixed with round keys in the second source packed data operand 422, or may be otherwise provided.

As shown, in some embodiments, the four 32-bit results of the four prior SM4 encryption or decryption rounds may optionally be arranged according to round order (e.g., according to ascending or descending round order). For example, in the illustration, a first 32-bit result ($X_i$) of a fourth prior SM4 round is stored in bits [31:0], a second 32-bit result ($X_{i+1}$) of a third prior SM4 round is stored in bits[63:32], a third 32-bit result ($X_{i+2}$) of a second prior SM4 round is stored in bits [95:64], and a fourth 32-bit result ($X_{i+3}$) of an immediately prior SM4 round is stored in bits [127:96]. In this embodiment the age of the round results increases with decreasing bit significance (e.g., results of older rounds are stored at lower order bit positions than results of younger rounds). In an alternate embodiment, a reverse order may also optionally be used. Storing the results arranged according to round order may tend to offer certain efficiencies or advantages from an overall algorithmic perspective (e.g., by reducing the number of data manipulation operations needed to prepare data for subsequent rounds), but is not required. In another embodiment, the elements may be stored in various other arrangements, not necessarily according to round order.

In the illustrated embodiment, the second source packed data operand 422 optionally has four 32-bit round keys corresponding to four prior SM4 encryption or decryption rounds, which are labeled $rK_i$, $rK_{i+1}$, $rK_{i+2}$, and $rK_{i+3}$. Including all four round keys in the same source packed data operand may offer certain efficiencies and/or advantages from an overall algorithmic perspective, but is not required. In other embodiments, these four round keys may be provided in two or more source operands, may be mixed with results of prior SM4 cipher rounds in the same source packed data, or may be otherwise provided.

As shown, in some embodiments, the four round keys may optionally be arranged according to round order (e.g., according to ascending or descending round order). For example, in the illustration, a first 32-bit round key ($rK_i$) of a fourth prior SM4 round is stored in bits [31:0], a second 32-bit round key ($rK_{i+1}$) of a third prior SM4 round is stored in bits[63:32], a third 32-bit round key ($rK_{i+2}$) of a second prior SM4 round is stored in bits [95:64], and a fourth 32-bit round key ($rK_{i+3}$) of an immediately prior SM4 round is stored in bits [127:96]. In this embodiment the age of the round for the round keys increases with decreasing bit significance in the operand or register (e.g., $rK_i$ is for an older round than $rK_{i+3}$). In an alternate embodiment, a reverse order may also optionally be used. Storing the round keys arranged according to round order may tend to offer certain efficiencies or advantages from an overall algorithmic perspective, but is not required. In another embodiment, the elements may be stored in various other arrangements, not necessarily according to round order.

Referring again to FIG. 4, a result packed data 426 may be generated and stored in a destination storage location in response to the instruction/operation. In some embodiments, the result packed data may include four 32-bit results of four immediately subsequent and sequential encryption or decryption rounds, which are labeled $X_{i+4}$, $X_{i+5}$, $X_{i+6}$, $X_{i+7}$. The four immediately subsequent and sequential rounds may immediately follow the four rounds corresponding to the input data elements $X_i$, $X_{i+1}$, $X_{i+2}$, and $X_{i+3}$, and may be sequential or consecutive rounds relative to one another. Including all four of these 32-bit results in the same result packed data may offer certain efficiencies and/or advantages from an overall algorithmic perspective, but is not required. In other embodiments, these four 32-bit results may be provided in two or more result packed data operands.

In some embodiments, the four 32-bit results may optionally be arranged according to round order (e.g., according to ascending or descending round order). As shown, in some embodiments, a first 32-bit result ($X_{i+4}$) of a fourth most recent SM4 cipher round may be stored in bits [31:0], a second 32-bit result ($X_{i+5}$) of a third most recent SM4 cipher round may be stored in bits[63:32], a third 32-bit result ($X_{i+6}$) of a second most recent SM4 cipher round may be stored in bits [95:64], and a fourth 32-bit result ($X_{i+7}$) of a most recent SM4 cipher round may be stored in bits [127:96]. Moreover, in some embodiments, the four 32-bit results (i.e., $X_{i+4}$, $X_{i+5}$, $X_{i+6}$, $X_{i+7}$) may optionally be arranged according to the same round order as the input source data elements (e.g., $X_i$, $X_{i+1}$, $X_{i+2}$, $X_{i+3}$ and/or $rK_i$, $rK_{i+1}$, $rK_{i+2}$, $rK_{i+3}$). Arranging the four 32-bit results according to round order and/or arranging them according to the same round order as the source/input data, may tend to offer certain efficiencies or advantages from an overall algorithmic perspective, but is not required.

FIG. 5 is a block diagram illustrating an embodiment of a SM4 four key expansion round operation 530 that may be performed in response to an embodiment of a SM4 four key expansion round instruction. The previously described characteristics, details, variations, and alternatives mentioned for the four cipher round operation of FIG. 4 may also optionally apply to the four key expansion round operation of FIG. 5, unless stated otherwise or otherwise clearly apparent.

The instruction may specify or otherwise indicate a first source packed data operand 518, and may specify or otherwise indicate a second source packed data operand 522. In various embodiments, the source operands may be stored in packed data registers, memory locations, or other storage locations. In some embodiments the instruction may indicate as source operands only these two source operands. Alternatively, fewer or more source operands may be used to provide the relevant data. In the illustrated embodiment, each of the first and second source packed data operands 518, 522 is a 128-bit operand that has four 32-bit data elements or "words."

In the illustrated embodiment, the first source packed data operand 518 optionally has four 32-bit results of four prior SM4 key expansion rounds, which are labeled $K_i$, $K_{i+1}$, $K_{i+2}$, and $K_{i+3}$. For example, in the illustration, a first 32-bit result ($K_i$) of a fourth prior SM4 key expansion round is stored in bits [31:0], a second 32-bit result ($K_{i+1}$) of a third prior SM4 key expansion round is stored in bits[63:32], a third 32-bit result ($K_{i+2}$) of a second prior SM4 key expansion round is stored in bits [95:64], and a fourth 32-bit result ($K_{i+3}$) of an immediately prior SM4 key expansion round is stored in bits [127:96]. Except for the first four so-called segments (i.e., $K_0$, $K_1$, $K_2$, $K_3$), each of these 32-bit results may represent a round key of a prior round.

The second source packed data operand 522 optionally has four 32-bit key generation constants, labeled $CK_i$, $CK_{i+1}$, $CK_{i+2}$, $CK_{i+3}$. Recall that the SM4 algorithm defines thirty-two predefined key generation constants $CK_0$-$CK_{31}$ which are to be input to the key expansion round function (F') represented by Equation 7. In the illustration, a first 32-bit key generation constant ($CK_i$) of a fourth prior SM4 key expansion round is stored in bits [31:0], a second 32-bit key generation constant ($CK_{i+1}$) of a third prior SM4 key expansion round is stored in bits[63:32], a third 32-bit key generation constant ($CK_{i+2}$) of a second prior SM4 key expansion round is stored in bits [95:64], and a fourth 32-bit key generation constant ($CK_{i+3}$) of an immediately prior SM4 key expansion round is stored in bits [127:96].

A result packed data 526 may be generated and stored in a destination storage location in response to the instruction/operation. In some embodiments, the result packed data may include four 32-bit results of four immediately subsequent and sequential key expansion rounds, which are labeled $K_{i+4}$, $K_{i+5}$, $K_{i+6}$, $K_{i+7}$. The four immediately subsequent and sequential rounds may immediately follow the four rounds corresponding to the input data elements (i.e., $K_i$, $K_{i+1}$, $K_{i+2}$, and $K_{i+3}$), and may be sequential or consecutive rounds relative to one another. As shown, in some embodiments, a first 32-bit result ($K_{i+4}$) of a fourth most recent SM4 key expansion round may be stored in bits [31:0], a second 32-bit result ($K_{i+5}$) of a third most recent SM4 key expansion round may be stored in bits[63:32], a third 32-bit result ($K_{i+6}$) of a second most recent SM4 key expansion round may be stored in bits [95:64], and a fourth 32-bit result ($K_{i+7}$) of a most recent SM4 key expansion round may be stored in bits [127:96].

Notice that, in the illustrated embodiment, all four 32-bit results of the four prior SM4 key expansion rounds (i.e., $K_i$, $K_{i+1}$, $K_{i+2}$, and $K_{i+3}$) are in the same source packed data 518, all four 32-bit key generation constants (i.e., $CK_i$, $CK_{i+1}$, $CK_{i+2}$, $CK_{i+3}$) are in the same source packed data 522, and all four 32-bit results of the four immediately subsequent and sequential key expansion rounds (i.e., $K_{i+4}$, $K_{i+5}$, $K_{i+6}$, $K_{i+7}$) are in the same result packed data 526. As previously mentioned, including like-type data elements in the same operand may tend to offer certain efficiencies and/or advantages from an overall algorithmic perspective, but is not required. Moreover, notice that, in the illustrated embodiment, the four 32-bit results of the four prior SM4 key expansion rounds (i.e., $K_i$, $K_{i+1}$, $K_{i+2}$, and $K_{i+3}$) are arranged according to round order, the four 32-bit key generation constants (i.e., $CK_i$, $CK_{i+1}$, $CK_{i+2}$, $CK_{i+3}$) are arranged in the same round order, and the four 32-bit results of the four immediately subsequent and sequential key expansion rounds (i.e., $K_{i+4}$, $K_{i+5}$, $K_{i+6}$, $K_{i+7}$) are also arranged in the same round order. As previously mentioned, arranging like-type data elements round order, and especially arranging each of the different types of data elements in the same round order, may tend to offer certain efficiencies and/or advantages from an overall algorithmic perspective, but is not required. In other embodiments, some or all of these various different types of data elements may be arranged variously among one or more packed data operands, not necessarily keeping like-type data elements in the same operand, and not necessarily according to round order, with both inter-operand and intra-operand rearrangements possible and contemplated.

One example embodiment of code to perform four rounds of SM4 encryption is listed below. In this code, rdi represents a pointer to 16-bytes where the ciphertext results are to be stored, rsi represents a pointer to 16-bytes of plaintext input data, and rdx represents a pointer to an input key schedule including round keys. SMS4RNDS4 is the name given to the SM4 four encryption round instruction. Xmm0 and xmm1 represent 128-bit packed data registers.

```
movdqu          xmm0, [rsi]
mov             rcx, 8
loop:
movdqu          xmm1, [rdx + 16*0]
SMS4RNDS4       xmm0, xmm1
add             rdx, 16
dec             rcx
jnz             loop
pshufd          xmm0, xmm0, 0x1b
movdqu          [rdi], xmm0
ret
```

Figure 6:
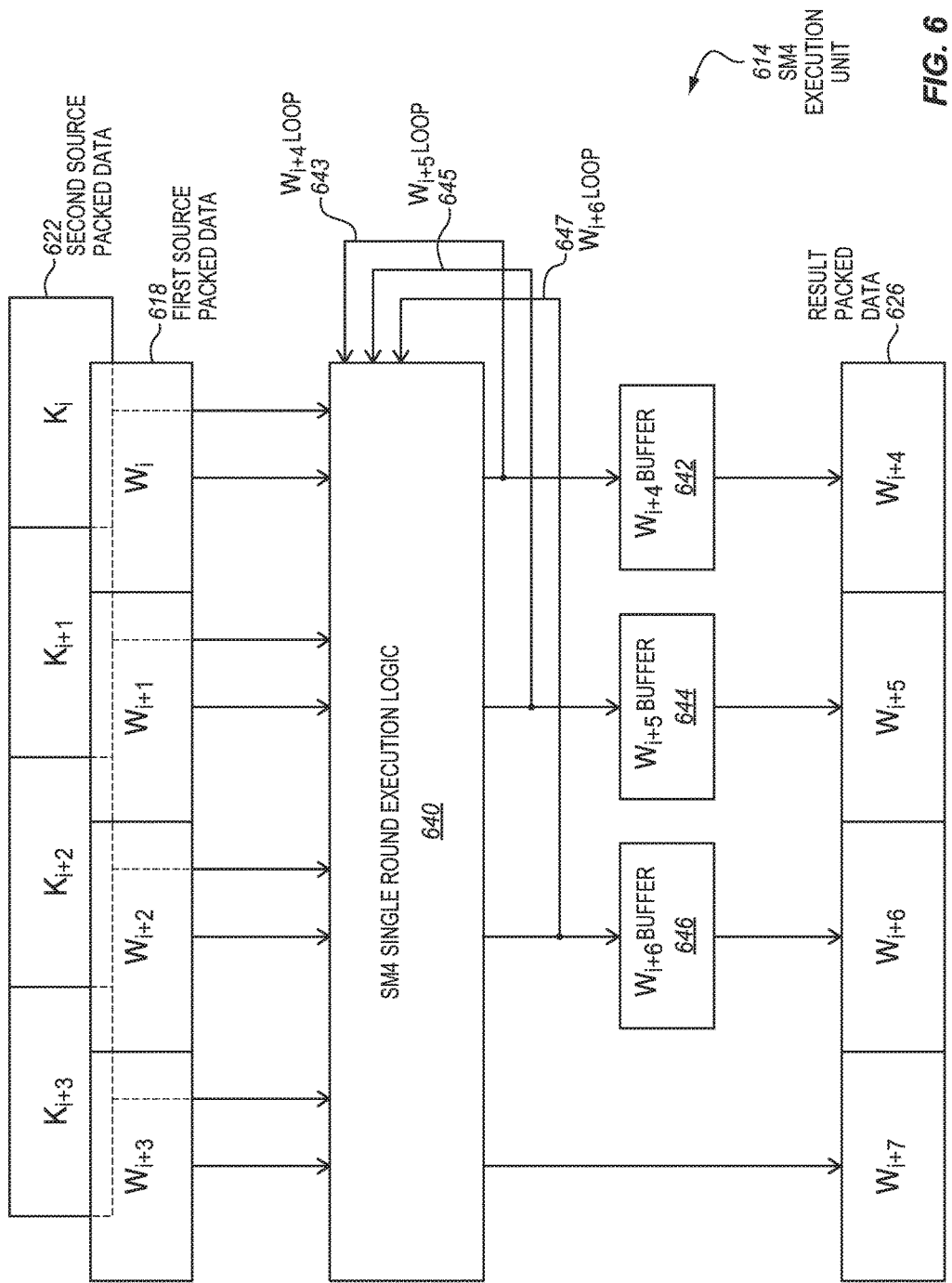
FIG. 6 is a block diagram of an example embodiment of an SM4 execution unit.

FIG. 6 is a block diagram of an example embodiment of an SM4 execution unit 614. In some embodiments, the SM4 execution unit may be capable of at least one of SM4 cipher and key expansion. In other embodiments, the SM4 execution unit may be capable of both SM4 cipher and key expansion. The SM4 execution unit is coupled with a first source packed data 618 and a second source packed data 622. The first source packed data, in this example, has four results of four immediately prior rounds ($W_i$, $W_{i+1}$, $W_{i+2}$, $W_{i+3}$). The second source packed data, in this example, has four values of four immediately prior rounds ($K_i$, $K_{i+1}$, $K_{i+2}$, $K_{i+3}$). In the case of cipher, these may be four round keys (e.g., $rK_i$, $rK_{i+1}$, $rK_{i+2}$, $rK_{i+3}$). In the case of key expansion, these may be four predetermined key generation constants (e.g., $CK_i$, $CK_{i+1}$, $CK_{i+2}$, $CK_{i+3}$).

The four results of four immediately prior rounds ($W_i$, $W_{i+1}$, $W_{i+2}$, $W_{i+3}$), and the four values of four immediately prior rounds ($K_i$, $K_{i+1}$, $K_{i+2}$, $K_{i+3}$), may be provided to an SM4 single round execution logic 640. The logic 640 may be operable to perform a single SM4 round (e.g., a single SM4 cipher round and/or a single SM4 key expansion round). The logic 640 may evaluate a round function (e.g., the cipher round function of Equation 1 or the key expansion round function of Equation 7) to generate a result of a current round ($W_{i+4}$). The result ($W_{i+4}$) may be stored in a $W_{i+4}$ buffer 642, and may be provided from an output of the logic 640 to an input thereof on a $W_{i+4}$ loop 643.

The result ($W_{i+4}$), as well as results from three immediately preceding rounds (i.e., $W_{i+3}$, $W_{i+2}$, $W_{i+1}$), and the value $K_{i+1}$, may be used to evaluate the round function again to generate a result ($W_{i+5}$). The result $W_{i+5}$ may be stored in a $W_{i+5}$ buffer 644, and may be provided from an output of the logic 640 to an input thereof on a $W_{i+5}$ loop 645. The result ($W_{i+5}$), as well as results from three immediately preceding rounds (i.e., $W_{i+4}$, $W_{i+3}$, $W_{i+2}$), and the value $K_{i+2}$, may be used to evaluate the round function again to generate a result ($W_{i+6}$). The result $W_{i+6}$ may be stored in a $W_{i+6}$ buffer 646, and may be provided from an output of the logic 640 to an input thereof on a $W_{i+6}$ loop 647. The result ($W_{i+6}$), as well as results from three immediately preceding rounds (i.e., $W_{i+5}$, $W_{i+4}$, $W_{i+3}$), and the value $K_{i+3}$, may be used to evaluate the round function again to generate a result ($W_{i+7}$). The SM4 execution unit may then store the four results $W_{i+4}$, $W_{i+5}$, $W_{i+6}$, and $W_{i+7}$ in a result packed data 626.

This is just one example of a suitable execution unit. To facilitate description, loops 643, 645, 647 have been shown and described, although the logic 640 may instead retain a copy of these values instead of outputting them and inputting them. In addition, the illustrated arrangement of the source and result data elements is not required, as described elsewhere herein.

FIG. 7 is a block diagram of an example embodiment of SM4 single round execution logic 740. The logic 740 is one suitable example embodiment for the logic 640 of FIG. 6. In the illustrated embodiment, the logic 740 is capable of both SM4 cipher and SM4 key expansion, although in other embodiments, the SM4 execution unit may be capable of only one of SM4 cipher and SM4 key expansion (e.g., SM4 cipher only).

The logic 740 includes a first XOR logic 750. In some embodiments, the first XOR logic may take as an input $W_{i+1}$, $W_{i+2}$, $W_{i+3}$, and either $rk_i$ (for cipher) or $CK_i$ (for key expansion), and may generate and output a value equal to $W_{i+1}$ XOR $W_{i+2}$ XOR $W_{i+3}$ XOR $rk_i$ (for cipher), or equal to $W_{i+1}$ XOR $W_{i+2}$ XOR $W_{i+3}$ XOR $CK_i$ (for key expansion).

The SM4 single round execution logic also includes a mixer-substitution function implementation logic 752. In some embodiments, the logic 752 may be capable of implementing a cipher mixer-substitution function T(x) and/or a key expansion mixer-substitution function T'(x). The logic 752 includes a non-linear substitution function τ(x) implementation logic 754. An input of a non-linear substitution function implementation logic 754 is coupled with an output of the first XOR logic 750. In some embodiments, the non-linear substitution function may include substitution box (Sbox) implementation logic (e.g., to perform one or more Sbox lookups or other non-linear byte substitution operations). By way of example, this may include a hardware lookup table (e.g., a series of multiple input single output multiplexers that select one of the inputs based on an input selection signal derived from an input byte).

The mixer-substitution function implementation logic 752 also includes a cipher linear substitution function L(B) implementation logic 756 and/or a key expansion linear substitution function L'(B) implementation logic 758. In the illustrated embodiment, the logic 752 includes both the L(B) implementation logic 756 and the L'(B) implementation logic 758. In other embodiments, the logic 752 may include only one but not both (e.g., only the logic 756). Representatively, each of the linear substitution functions may include XOR logic 760, 761 and left rotate logic 762, 763.

The SM4 single round execution logic also includes a second XOR logic 764. An input of the second XOR logic is coupled with an output of the mixer-substitution function implementation logic 752. In the illustrated embodiment, the second XOR logic may receive either an evaluation T(x) from the logic 756 (e.g., for cipher) and/or may an evaluation T'(x) from the logic 758 (e.g., for key expansion). In some embodiments, the second XOR logic may generate and output a value equal to $W_i$ XOR T(x) (e.g., for cipher), or $W_i$ XOR T'(x) (e.g., for key expansion), to generate a 32-bit result for the current round ($W_{i+4}$).

FIG. 8A is a block diagram of an example embodiment of an instruction format 870 for an SM4 four round cipher instruction and an instruction format 872 for an SM4 four round key expansion instruction. The instruction format 870 has a first operation code or opcode 871 to identify the type of instruction and/or operation to be performed is that of SM4 four round cipher). Similarly, the instruction format 872 has a second, different operation code or opcode 873 to identify the type of instruction and/or operation to be performed is that of SM4 four round key expansion. The opcodes may represent a plurality of bits or one or more fields. In the illustrated example, each of the instruction formats also includes a first source specifier 874-1, 874-2, a second source specifier 876-1, 876-2, and an optional destination specifier 878-1, 878-2, although the scope of the invention is not so limited. By way of example, each of these specifiers may include bits or one or more fields to specify an address of a register, memory location, or other storage location.

FIG. 8B is a block diagram of an example embodiment of an instruction format 880 for a single SM4 acceleration instruction to perform both cipher and key expansion. The instruction format has a first operation code or opcode 881 to identify the type of instruction and/or operation to be performed is that of either SM4 four round cipher or SM4 four round key expansion. The instruction format also has a cipher or key expansion selector field 882 to select whether cipher (e.g., encryption or decryption) or key expansion is to be performed. The selector field may include one or more non-opcode bits. As one example, the selector field may optionally be provided by an immediate (e.g., an 8-bit, 4-bit, or 2-bit immediate). The selector filed may be used to select whether an L(x) linear substitution function or an L'(x) linear substitution function is to be used. The format also includes, in the illustrated example, a first source specifier 874, a second source specifier 876, and an optional destination specifier 878, although the scope of the invention is not so limited. By way of example, each of these specifiers may include bits or one or more fields to specify an address of a register, memory location, or other storage location.

The formats of FIGS. 8A-8B are just illustrative examples. In other embodiments, one or more of the first source specifier, the second source specifier, and the destination specifier (i.e., one of the explicit specifiers) may optionally be implicit (e.g., implicit to the instruction or opcode) rather than being explicitly specified. For example, in some embodiments, instead of an explicit destination specifier, a same storage location specified by one of the first and second source specifiers may optionally be implicitly or impliedly to be used as the destination storage location. Moreover, alternate embodiments may have fewer or more sources (e.g., a single 256-bit source, four 64-bit sources, etc.). In addition, the illustrated order/arrangement of the fields and is not required, but rather the fields may be rearranged, overlapped, fields need not include contiguous sequences of bits but rather may be composed of non-contiguous or separated bits, etc.

The instructions and processors described here are intended to implement the SM4 cryptographic algorithm and obtain values that are consistent with the SM4 cryptographic algorithm. Any possible discrepancies or inconsistencies in the description (e.g., due to typographical errors or otherwise) that would lead to results inconsistent with the SM4 algorithm are unintentional and erroneous. In addition, while the current version of the SM4 algorithm has been described, it is to be appreciated that embodiments are also applicable to extensions of this standard, derivations of this standard, modifications of this standard, related standards, and the like, which meet the limitations of the claims. The SM4 standard refers to the known standard descried herein regardless of whether it is called SM4, SMS4, or some other name.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS TECHNOLOGIES Corporation of Sunnyvale, Calif.; the ARM instruction set (with optional additional extensions such as NEON) of ARM HOLDINGS Company of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
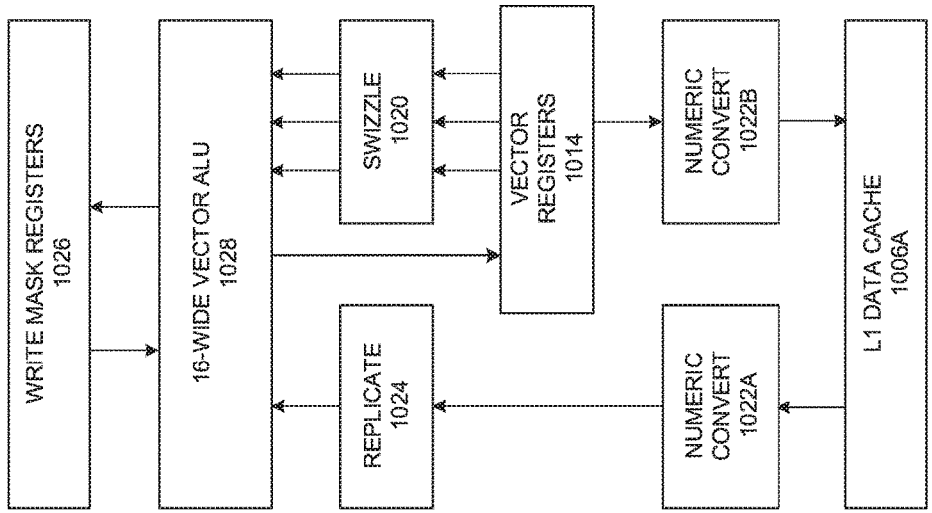
FIG. 10B is a block diagram of an embodiment of an expanded view of part of the processor core of FIG. 10A.
Figure 10A:
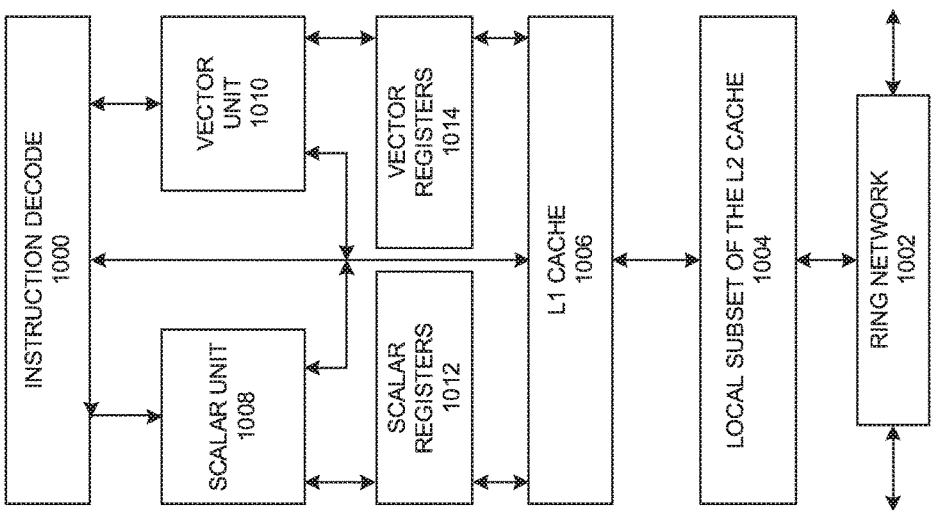
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
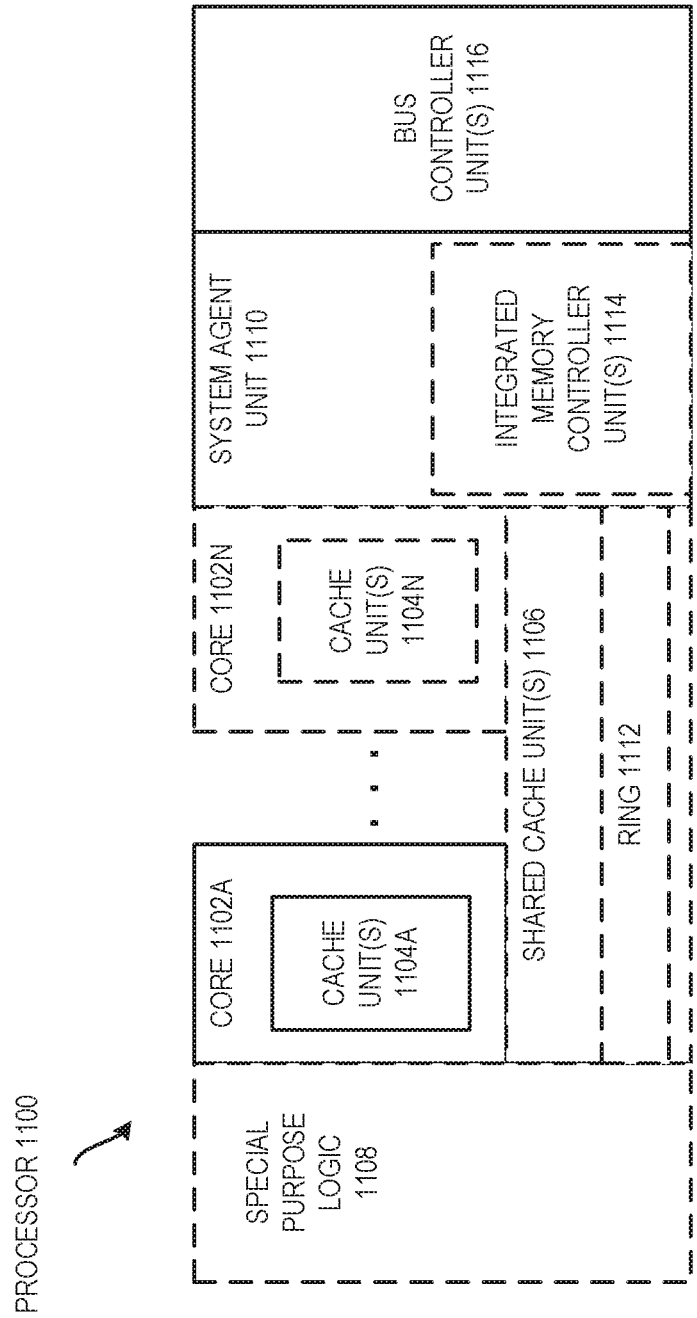
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
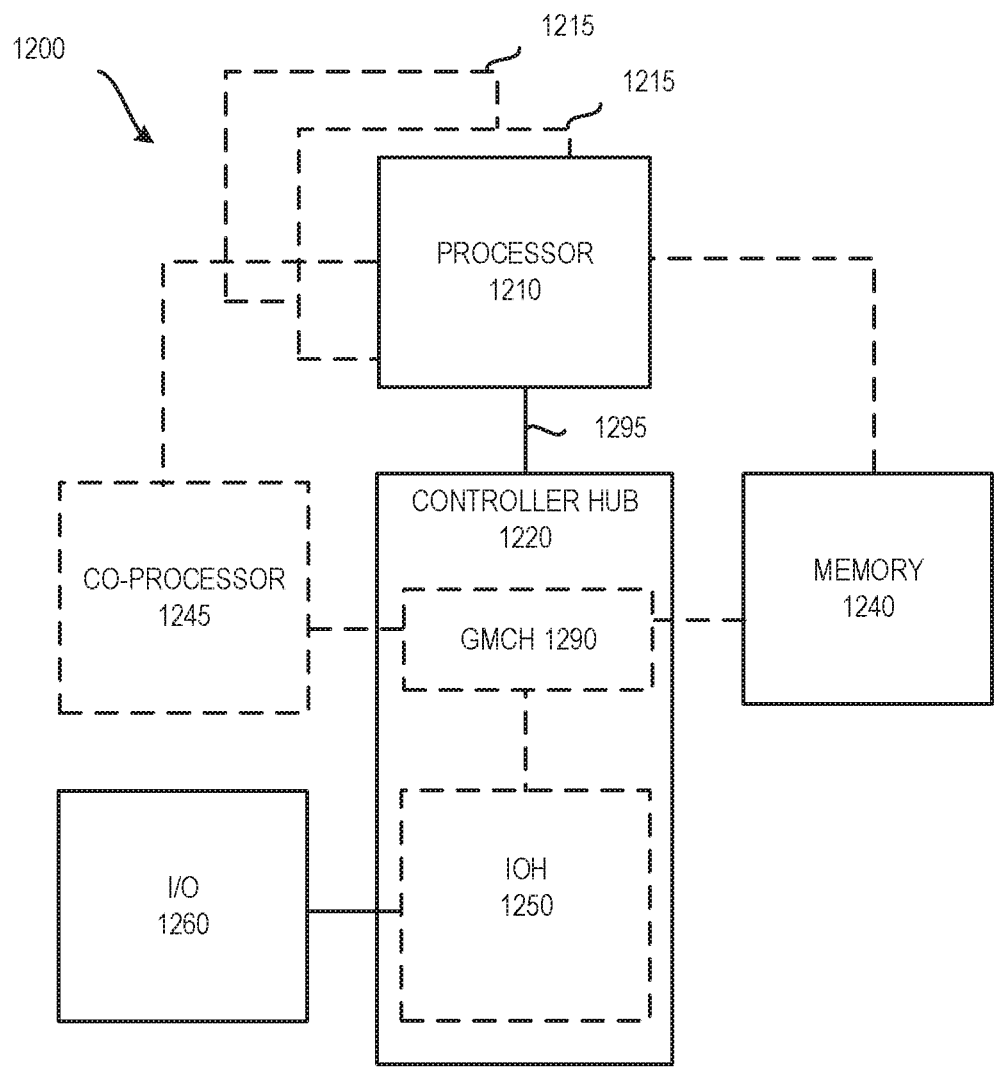
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
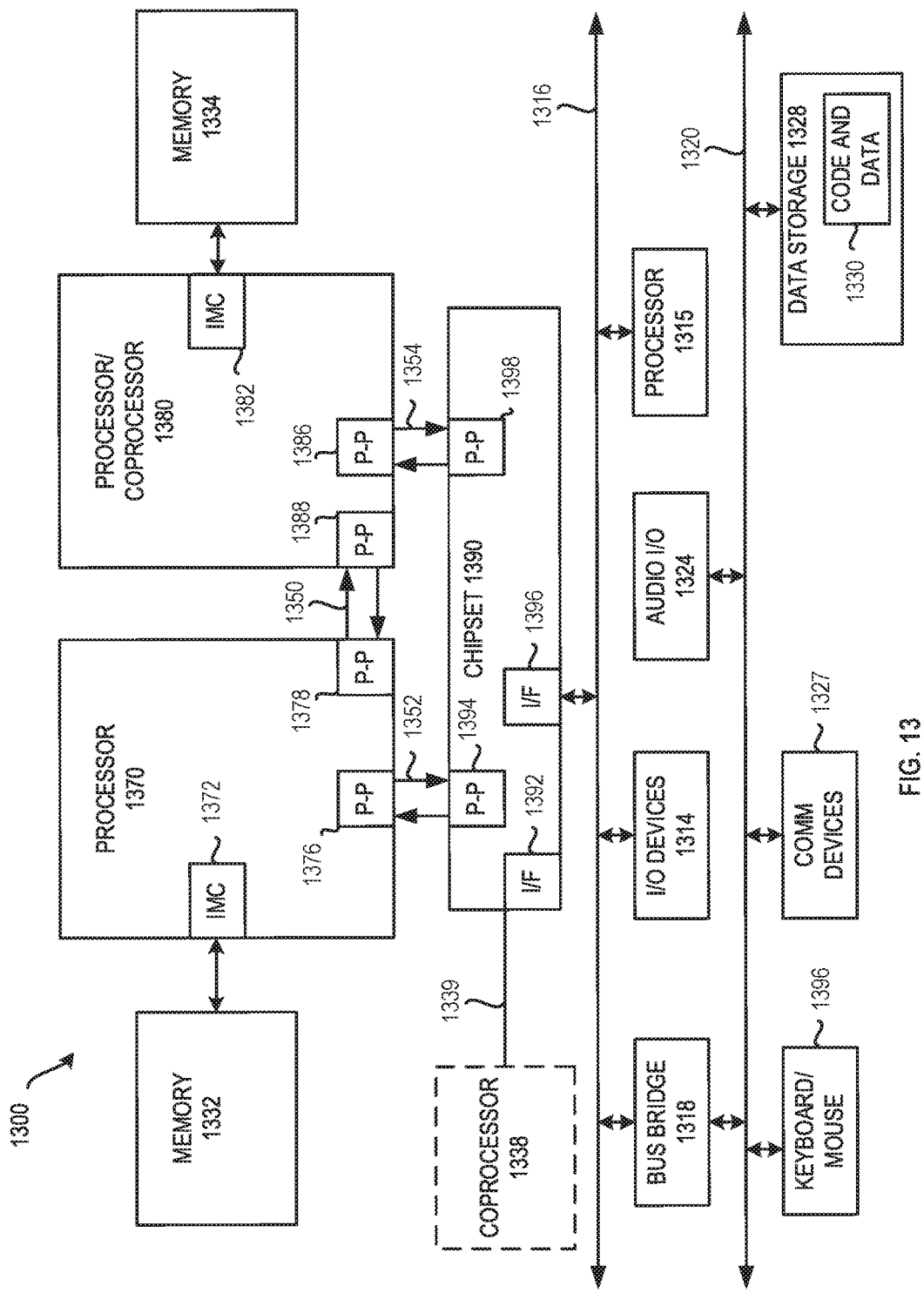
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
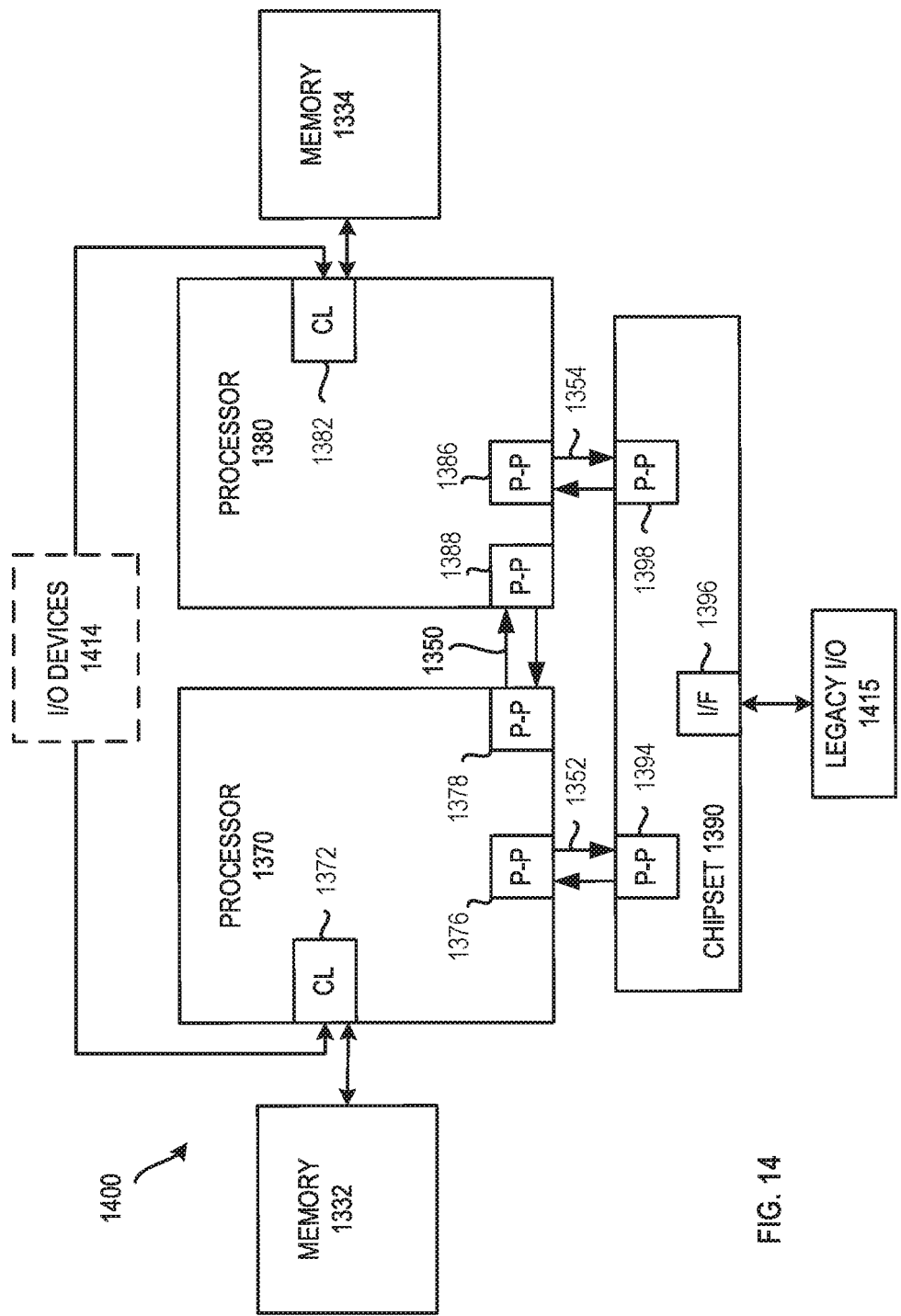
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
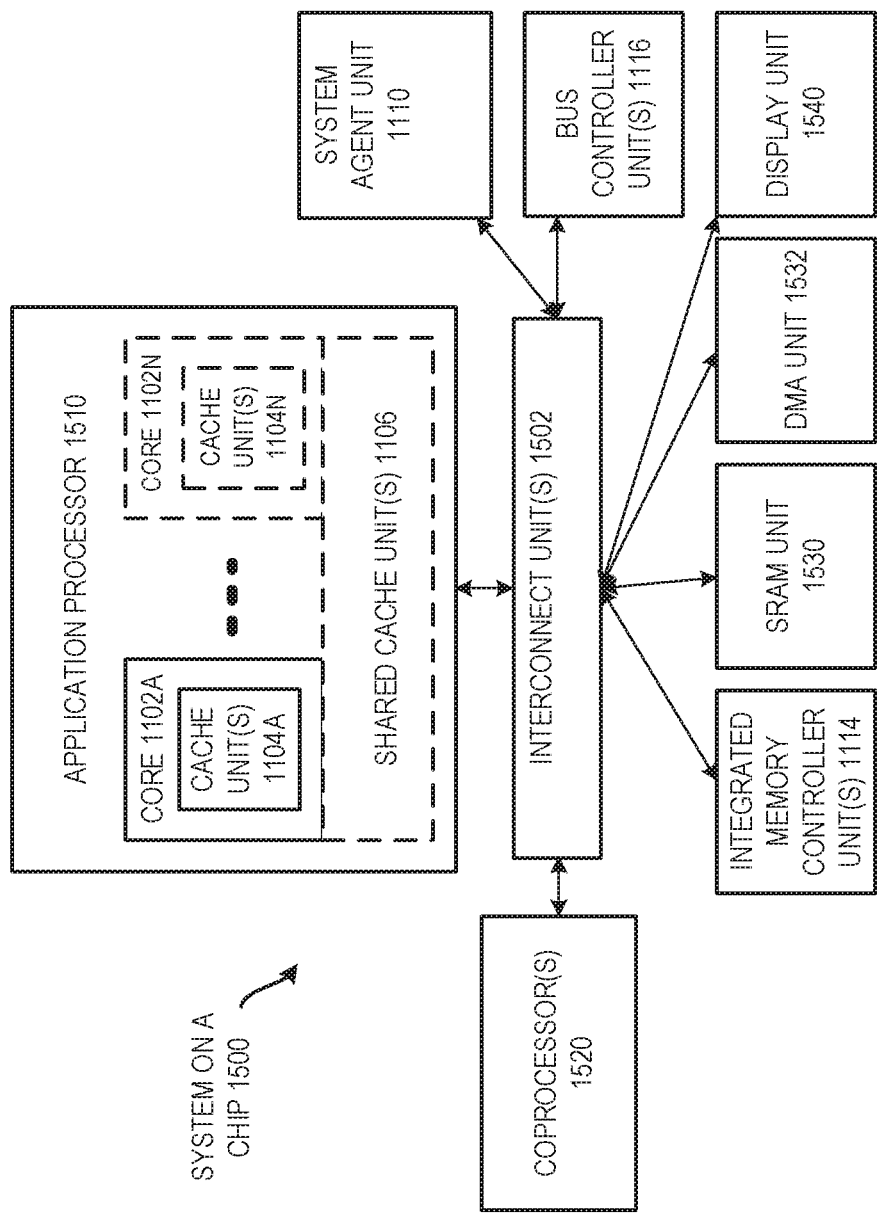
FIG. 15 is a block diagram of an embodiment of a system-on-a-chip architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS TECHNOLOGIES Corporation of Sunnyvale, Calif. and/or that execute the ARM instruction set of ARM HOLDINGS Company of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 4-8 may also optionally be used in any of FIGS. 2-3. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein. In some embodiments, the instructions may have features or details of the instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic" has been used. This term refers to hardware, firmware, software, or various combinations thereof. In example embodiments, this term may refer to integrated circuitry, application specific integrated circuits, analog circuits, digital circuits, programed logic devices, memory devices including instructions, and the like, and various combinations thereof. In some embodiments, it may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide (e.g., store) one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, other wireless devices, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a plurality of packed data registers, and a decode unit to decode an instruction. The instruction is to indicate one or more source packed data operands that are to have four 32-bit results of four prior SM4 cryptographic rounds, and four 32-bit values. The processor also includes an execution unit coupled with the decode unit and the plurality of the packed data registers. The execution unit, in response to the instruction, is to store four 32-bit results of four immediately subsequent and sequential SM4 cryptographic rounds in a destination storage location that is to be indicated by the instruction.

Example 2 includes the processor of Example 1, in which the decode unit is to decode the instruction that is to indicate a first 128-bit source packed data operand that is to have the four 32-bit results of the four prior SM4 cryptographic rounds. The instruction is also to indicate a second 128-bit source packed data operand that is to have the four 32-bit values.

Example 3 includes the processor of any one of Examples 1-2, in which the four 32-bit results of the four prior SM4 cryptographic rounds are to be arranged according to round order in a source packed data operand.

Example 4 includes the processor of any one of Examples 1-3, in which the 32-bit values and the 32-bit results for corresponding rounds are to be stored in corresponding data elements of first and second source packed data operands.

Example 5 includes the processor of any one of Examples 1-4, in which the decode unit is to decode the instruction in which the four 32-bit results are four 32-bit results of four prior SM4 encryption rounds. Also, where the four 32-bit values are four 32-bit round keys for the four prior SM4 encryption rounds. Further, where the execution unit is to store the four 32-bit results of the four immediately subsequent and sequential rounds, which are four 32-bit results of four immediately subsequent and sequential SM4 encryption rounds.

Example 6 includes the processor of any one of Examples 1-4, in which the decode unit is to decode the instruction in which the four 32-bit results are four 32-bit results of four prior SM4 decryption rounds. Also, where the four 32-bit values are four 32-bit round keys for the four prior SM4 decryption rounds. Further, where the execution unit is to store the four 32-bit results of the four immediately subsequent and sequential rounds which are four 32-bit results of four immediately subsequent and sequential SM4 decryption rounds.

Example 7 includes the processor of any one of Examples 1-4, in which the decode unit is to decode the instruction in which the four 32-bit results are four 32-bit round keys for four prior SM4 key expansion rounds. Also, where the four 32-bit values are four 32-bit key generation constants for the four prior SM4 key expansion rounds. Further, where the execution unit is to store the four 32-bit results of the four immediately subsequent and sequential rounds which are four 32-bit round keys for four immediately subsequent and sequential SM4 key expansion rounds.

Example 8 includes the processor of any one of Examples 1-3, in which the decode unit is to decode the instruction that is to indicate a first source packed data operand that is to include a first 32-bit result of a fourth prior SM4 cryptographic algorithm round in bits [31:0], and a second 32-bit result of a third prior SM4 cryptographic algorithm round in bits [63:32]. The first source packed data operand that is also to include a third 32-bit result of a second prior SM4 cryptographic algorithm round in bits [95:64], and a fourth 32-bit result of an immediately prior SM4 cryptographic algorithm round in bits [127:96].

Example 9 includes the processor of Example 8, in which the execution unit in response to the instruction is to store a result packed data that is to include a first 32-bit result of a fourth most recent SM4 cryptographic algorithm round in bits [31:0], and a second 32-bit result of a third most recent SM4 cryptographic algorithm round in bits [63:32]. The result packed data is also to include a third 32-bit result of a second most recent SM4 cryptographic algorithm round in bits [95:64], and a fourth 32-bit result of a most recent SM4 cryptographic algorithm round in bits [127:96].

Example 10 includes the processor of any one of Examples 1 to 9, in which the decode unit is to decode the instruction that is to have one or more bits to specify whether the four immediately subsequent and sequential SM4 cryptographic rounds are cipher rounds or key expansion rounds.

Example 11 includes the processor of any one of Examples 1 to 9, in which the execution unit, in response to the instruction, for each of the four immediately subsequent and sequential SM4 cryptographic rounds, is to perform a first set of exclusive OR (XOR) operations, a non-linear substitution function operation, a linear substitution function operation including XOR and rotate operations, and an XOR operation.

Example 12 includes the processor of any one of Examples 1 to 9, in which the execution unit, in response to the instruction, is to store the four 32-bit results of the four immediately subsequent and sequential SM4 cryptographic rounds in a destination storage location explicitly specified by the instruction separately than all of the one or more source packed data operands.

Example 13 includes the processor of any one of Examples 1 to 9, in which the execution unit, in response to the instruction, is to store the four 32-bit results of the four immediately subsequent and sequential SM4 cryptographic rounds in a destination storage location that is implicitly to be the same as a storage location used for one or more of the one or more source packed data operands.

Example 14 is a method in a processor that includes receiving an instruction indicating one or more source packed data operands. The one or more source packed data operands have four 32-bit results of four prior SM4 cryptographic rounds, and four 32-bit values. The method also includes storing four 32-bit results of four immediately subsequent and sequential SM4 cryptographic rounds in a destination storage location in response to the instruction. The destination storage location is indicated by the instruction.

Example 15 includes the method of Example 14, in which storing includes storing the four 32-bit results of the four immediately subsequent and sequential SM4 cryptographic rounds in a 128-bit packed data operand.

Example 16 includes the method of any one of Examples 14-15, in which storing includes storing the four 32-bit results of the four immediately subsequent and sequential SM4 cryptographic rounds arranged according to round order.

Example 17 includes the method of any one of Examples 14-16, in which storing includes storing the four 32-bit results of the four immediately subsequent and sequential SM4 cryptographic rounds which are four immediately subsequent and sequential SM4 encryption rounds.

Example 18 includes the method of any one of Examples 14-16, in which storing includes storing, as the four 32-bit results of the four immediately subsequent and sequential SM4 cryptographic rounds, four 32-bit round keys for the four immediately subsequent and sequential SM4 cryptographic rounds which are key expansion rounds.

Example 19 includes the method of any one of Examples 14-18, in which receiving includes receiving the instruction having one or more bits to specify whether the four immediately subsequent and sequential SM4 cryptographic rounds are cipher rounds or key expansion rounds.

Example 20 includes the method of any one of Examples 14-18, further including generating each of the four 32-bit results of the four immediately subsequent and sequential SM4 cryptographic rounds including performing, for each round, a first set of exclusive OR (XOR) operations, a non-linear substitution operation, a linear substitution operation, and an XOR operation.

Example 21 is a system to process instructions including an interconnect, and a processor coupled with the interconnect. The processor is to receive an instruction that is to indicate one or more source packed data operands that are to have four 32-bit results of four prior cryptographic rounds, and four 32-bit values. The processor, in response to the instruction, is to store four 32-bit results of four immediately subsequent and sequential cryptographic rounds in a destination storage location that is to be indicated by the instruction. The cryptographic rounds are those of a cryptographic algorithm that has a non-linear substitution function and a linear substitution function. The linear substitution function is to perform the following operations on a value (B), B XOR (B<<<2) XOR (B<<<10) XOR (B<<<18) XOR (B<<<24), where <<< represents a left rotate and XOR represents an exclusive OR. The system also includes a dynamic random access memory (DRAM) coupled with the interconnect.

Example 22 includes the system of Example 21, in which the processor, in response to the instruction, is to store the four 32-bit results of the four immediately subsequent and sequential cryptographic rounds arranged in round order in the destination storage location.

Example 23 is an article of manufacture including a non-transitory machine-readable storage medium. The non-transitory machine-readable storage medium stores an instruction. The instruction is to indicate four 32-bit round keys of four prior key expansion rounds and four 32-bit key generation constants of a cryptographic algorithm. The cryptographic algorithm defines system parameter segments including, if expressed in hexadecimal notation, a3b1bac6, 56aa3350, 677d9197, and b27022dc. The instruction if executed by a machine is to cause the machine to perform operations including storing a result packed data in a destination storage location that is to be indicated by the instruction. The result packed data is to include four 32-bit round keys of four immediately subsequent and sequential SM4 key expansion rounds.

Example 24 includes the article of Example 23, in which the four 32-bit round keys are to be stored in a 128-bit result packed data and are to be arranged according to round order.

Example 25 includes a processor or other apparatus that is operative to perform the method of any one of Examples 14-20.

Example 26 includes a processor or other apparatus that includes means for performing the method of any one of Examples 14-20.

Example 27 includes a processor that includes any combination of modules, units, logic, circuitry, and means to perform the method of any one of Examples 14-20.

Example 28 includes an article of manufacture that includes an optionally non-transitory machine-readable medium that optionally stores or otherwise provides an instruction that if and/or when executed by a processor, computer system, or other machine is operative to cause the machine to perform the method of any one of Examples 14-20.

Example 29 includes a computer system or other electronic device including an interconnect, the processor of any one of Examples 1-13 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 30 includes a processor or other apparatus substantially as described herein.

Example 31 includes a processor or other apparatus that is operative to perform any method substantially as described herein.

Example 32 includes a processor or other apparatus including means for performing any method substantially as described herein.

Example 33 includes a processor or other apparatus that is operative to perform any four round SM4 instruction substantially as described herein.

Example 34 includes a processor or other apparatus including means for performing any four round SM4 instruction substantially as described herein.

Example 35 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 36 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A system on a chip (SoC) comprising:
an integrated memory controller; and
a processor core coupled to the integrated memory controller, the processor core comprising:
   a data cache;
   a data TLB coupled to the data cache;
   a branch prediction unit;
   an instruction cache;
   an instruction translation lookaside buffer (TLB) coupled to the instruction cache;
   an instruction fetch unit to fetch instructions, including an instruction;
   a level 2 (L2) cache coupled to the data cache, and coupled to the instruction cache;
   a plurality of registers to store single instruction, multiple data (SIMD) data, including a first register, and a second register, the first register to store a first source data that includes four round keys corresponding to four prior key expansion rounds of an SM4 cryptographic algorithm, the second register to store a second source data that includes four key generation constants;
   a decode unit to decode the instruction, the instruction having a first field to specify the first register, a second field to specify the second register, and a third field to specify a destination register of the plurality of registers; and
   an execution unit coupled to the decode unit, and coupled to the plurality of registers, the execution unit, in response to the decode of the instruction, to generate and store a result in the destination register, the result to include four round keys corresponding to four sequential key expansion rounds of the SM4 cryptographic algorithm that sequentially follow the four prior key expansion rounds, wherein the execution unit is to generate each of the four round keys to be consistent with an evaluation of a key expansion linear substitution function with a value for the corresponding key expansion round, which is equal to the value logically XOR'd with the value rotated left by thirteen bits logically XOR'd with the value rotated left by twenty-three bits.

2. The SoC of claim 1, wherein the second source data is 128-bits and is to include:
a first key generation constant for a fourth most recent of the four prior key expansion rounds in bits [31:0];
a second key generation constant for a third most recent of the four prior key expansion rounds in bits [63:32];
a third key generation constant for a second most recent of the four prior key expansion rounds in bits [95:64]; and
a fourth key generation constant for a most recent of the four prior key expansion rounds in bits [127:96].

3. The SoC of claim 1, wherein the result is 128-bits and is to include:
a fifth round key for a fourth most recent of the four sequential key expansion rounds in bits [31:0];
a sixth round key for a third most recent of the four sequential key expansion rounds in bits [63:32];
a seventh round key for a second most recent of the four sequential key expansion rounds in bits [95:64]; and
an eighth round key for a most recent of the four sequential key expansion rounds in bits [127:96].

4. The SoC of claim 1, wherein the execution unit, in response to the decode of the instruction, is to generate each of the four round keys by performing a mixer substitution for the corresponding sequential key expansion round, the mixer substitution including a linear substitution on a result of a non-linear substitution.

5. The SoC of claim 1, wherein the processor core is a reduced instruction set computing (RISC) processor core.

6. The SoC of claim 1, wherein the first source data is to have a first round key in bits [31:0], a second round key in bits [63:32], a third round key in bits [95:64], and a fourth round key in bits [127:96], wherein the second source data is to have a first key generation constant in bits [31:0], a second key generation constant in bits [63:32], a third key generation constant in bits [95:64], and a fourth key generation constant in bits [127:96], and wherein the result is to include a fifth round key in bits [31:0] that is equal to the first round key logically exclusive OR'd (XOR'd) with a first output of a function evaluated with a first input, the first input equal to the second round key logically XOR'd with the third round key logically XOR'd with the fourth round key logically XOR'd with the first key generation constant, the first output equal to a first value, which is equal to a substitution box applied to the first input, logically XOR'd with the first value rotated left by thirteen bits logically XOR'd with the first value rotated left by twenty-three bits.

7. The SoC of claim 6, wherein the result is further to include:
a sixth round key in bits [63:32] that is equal to the second round key logically XOR'd with a second output of the function evaluated with a second input, the second input equal to the third round key logically XOR'd with the fourth round key logically XOR'd with the fifth round key logically XOR'd with the second key generation constant, the second output equal to a second value, which is equal to a substitution box applied to the second input, logically XOR'd with the second value rotated left by thirteen bits logically XOR'd with the second value rotated left by twenty-three bits;
a seventh round key in bits [95:64] that is equal to the third round key logically XOR'd with a third output of the function evaluated with a third input, the third input equal to the fourth round key logically XOR'd with the fifth round key logically XOR'd with the sixth round key logically XOR'd with the third key generation constant, the third output equal to a third value, which is equal to a substitution box applied to the third input, logically XOR'd with the third value rotated left by thirteen bits logically XOR'd with the third value rotated left by twenty-three bits; and
an eighth round key in bits [127:96] that is equal to the fourth round key logically XOR'd with a fourth output of the function evaluated with a fourth input, the fourth input equal to the fifth round key logically XOR'd with the sixth round key logically XOR'd with the seventh round key logically XOR'd with the fourth key generation constant, the fourth output equal to a fourth value, which is equal to a substitution box applied to the fourth input, logically XOR'd with the fourth value rotated left by thirteen bits logically XOR'd with the fourth value rotated left by twenty-three bits.

8. The SoC of claim 1, further comprising a graphics processing unit coupled to the processor core.

9. The SoC of claim 1, further comprising an image processor coupled to the processor core.

10. The SoC of claim 1, further comprising an audio processor coupled to the processor core.

11. The SoC of claim 1, further comprising a coprocessor coupled to the processor core.

12. The SoC of claim 1, further comprising a communication processor coupled to the processor core.

13. The SoC of claim 1, further comprising a network processor coupled to the processor core.

14. The SoC of claim 1, further comprising a display unit coupled to the processor core, the display unit to couple an external display.

15. The SoC of claim 1, further comprising an interconnect coupled to the processor core and the integrated memory controller.

16. The SoC of claim 15, wherein the interconnect comprises a ring interconnect.

17. The SoC of claim 1, further comprising a direct memory access (DMA) unit coupled to the processor core.

18. A system on a chip (SoC) comprising:
an integrated memory controller; and
a processor core coupled to the integrated memory controller, the processor core comprising:
a plurality of registers to store single instruction, multiple data (SIMD) data, including a first register, and a second register, the first register to store a first source data that includes four round keys corresponding to four prior key expansion rounds of an SM4 cryptographic algorithm, the second register to store a second source data that includes four key generation constants;
a decode unit to decode an instruction, the instruction having a first field to specify the first register, a second field to specify the second register, and a third field to specify a destination register of the plurality of registers; and
an execution unit coupled to the decode unit, and coupled to the plurality of registers, the execution unit, in response to the decode of the instruction, to generate and store a result in the destination register, the result to include four round keys corresponding to four sequential key expansion rounds of the SM4 cryptographic algorithm that sequentially follow the four prior key expansion rounds, wherein the execution unit is to generate each of the four round keys to be consistent with an evaluation of a key expansion linear substitution function with a value for the corresponding key expansion round, which is equal to the value logically XOR'd with the value rotated left by thirteen bits logically XOR'd with the value rotated left by twenty-three bits.

19. The SoC of claim 18, wherein the processor core is a reduced instruction set computing (RISC) processor core, and wherein the result is 128-bits and is to include:
a fifth round key for a fourth most recent of the four sequential key expansion rounds in bits [31:0];
a sixth round key for a third most recent of the four sequential key expansion rounds in bits [63:32];
a seventh round key for a second most recent of the four sequential key expansion rounds in bits [95:64]; and
an eighth round key for a most recent of the four sequential key expansion rounds in bits [127:96].

20. The SoC of claim 19, wherein the second source data is 128-bits and is to include:
a first key generation constant for a fourth most recent of the four prior key expansion rounds in bits [31:0];
a second key generation constant for a third most recent of the four prior key expansion rounds in bits [63:32];
a third key generation constant for a second most recent of the four prior key expansion rounds in bits [95:64]; and a fourth key generation constant for a most recent of the four prior key expansion rounds in bits [127:96].

21. The SoC of claim 18, wherein the first source data is to have a first round key in bits [31:0], a second round key in bits [63:32], a third round key in bits [95:64], and a fourth round key in bits [127:96], wherein the second source data is to have a first key generation constant in bits [31:0], a second key generation constant in bits [63:32], a third key generation constant in bits [95:64], and a fourth key generation constant in bits [127:96], and wherein the result is to include a fifth round key in bits [31:0] that is equal to the first round key logically exclusive OR'd (XOR'd) with a first output of a function evaluated with a first input, the first input equal to the second round key logically XOR'd with the third round key logically XOR'd with the fourth round key logically XOR'd with the first key generation constant, the first output equal to a first value, which is equal to a substitution box applied to the first input, logically XOR'd with the first value rotated left by thirteen bits logically XOR'd with the first value rotated left by twenty-three bits.

22. The SoC of claim 21, wherein the result is further to include:
a sixth round key in bits [63:32] that is equal to the second round key logically XOR'd with a second output of the function evaluated with a second input, the second input equal to the third round key logically XOR'd with the fourth round key logically XOR'd with the fifth round key logically XOR'd with the second key generation constant, the second output equal to a second value, which is equal to a substitution box applied to the second input, logically XOR'd with the second value rotated left by thirteen bits logically XOR'd with the second value rotated left by twenty-three bits;
a seventh round key in bits [95:64] that is equal to the third round key logically XOR'd with a third output of the function evaluated with a third input, the third input equal to the fourth round key logically XOR'd with the fifth round key logically XOR'd with the sixth round key logically XOR'd with the third key generation constant, the third output equal to a third value, which is equal to a substitution box applied to the third input, logically XOR'd with the third value rotated left by thirteen bits logically XOR'd with the third value rotated left by twenty-three bits; and
an eighth round key in bits [127:96] that is equal to the fourth round key logically XOR'd with a fourth output of the function evaluated with a fourth input, the fourth input equal to the fifth round key logically XOR'd with the sixth round key logically XOR'd with the seventh round key logically XOR'd with the fourth key generation constant, the fourth output equal to a fourth value, which is equal to a substitution box applied to the fourth input, logically XOR'd with the fourth value rotated left by thirteen bits logically XOR'd with the fourth value rotated left by twenty-three bits.

23. The SoC of claim 21, wherein the execution unit, in response to the decode of the instruction, is to generate each of the four round keys by performing a mixer substitution for the corresponding sequential key expansion round, the mixer substitution including a linear substitution on a result of a non-linear substitution, and wherein the processor core further comprises:
a data cache;
a data TLB coupled to the data cache;
a branch prediction unit;
an instruction cache;
an instruction translation lookaside buffer (TLB) coupled to the instruction cache;
an instruction fetch unit to fetch instructions, including the instruction; and
a level 2 (L2) cache coupled to the data cache, and coupled to the instruction cache.

24. The SoC of claim 18, further comprising a network processor coupled to the processor core.

25. The SoC of claim 18, further comprising a communication processor coupled to the processor core.

26. The SoC of claim 18, further comprising an audio processor coupled to the processor core.

27. The SoC of claim 18, further comprising a graphics processing unit coupled to the processor core.

28. The SoC of claim 18, further comprising an interconnect coupled to the processor core and the integrated memory controller, wherein the interconnect comprises a ring interconnect.

29. The SoC of claim 18, further comprising an image processor coupled to the processor core.

30. A method performed by a system on a chip (SoC) comprising:
accessing data from a memory with an integrated memory controller of the SoC;
dynamically allocating a plurality of registers that are used to store single instruction, multiple data (SIMD) data using register renaming;
receiving a first source data including four round keys corresponding to four prior key expansion rounds of an SM4 cryptographic algorithm, from a first register of the plurality of registers;
receiving a second source data including four key generation constants from a second register of the plurality of registers;
decoding an instruction having a first field specifying the first register, a second field specifying the second register, and a third field specifying a destination register of the plurality of registers;
generating a result, in response to the decode of the instruction, the result including four round keys corresponding to four sequential key expansion rounds of the SM4 cryptographic algorithm that sequentially follow the four prior key expansion rounds, wherein each of the four round keys is generated to be consistent with an evaluation of a key expansion linear substitution function with a value for the corresponding key expansion round, which is equal to the value logically XOR'd with the value rotated left by thirteen bits logically XOR'd with the value rotated left by twenty-three bits; and
storing the result in the destination register in response to the decode of the instruction.

31. The method of claim 30, wherein said receiving the second source data comprises receiving a first key generation constant for a fourth most recent of the four prior key expansion rounds from bits [31:0] of the second register, receiving a second key generation constant for a third most recent of the four prior key expansion rounds from bits [63:32] of the second register, receiving a third key generation constant for a second most recent of the four prior key expansion rounds from bits [95:64] of the second register, and receiving a fourth key generation constant for a most recent of the four prior key expansion rounds from bits [127:96] of the second register, and wherein said storing the result comprises storing a fifth round key for a fourth most recent of the four sequential key expansion rounds in bits [31:0] of the destination register, storing a sixth round key for a third most recent of the four sequential key expansion rounds in bits [63:32] of the destination register, storing a seventh round key for a second most recent of the four sequential key expansion rounds in bits [95:64] of the destination register, and storing an eighth round key for a most recent of the four sequential key expansion rounds in bits [127:96] of the destination register.

32. An article of manufacture comprising a non-transitory machine-readable storage medium, the non-transitory machine-readable storage medium storing instructions, wherein the instructions, if executed by a machine including a system on a chip (SoC), are to cause the machine to perform operations comprising to:
   access data from a memory with an integrated memory controller of a SoC;
   receive a first source data from a first register of a plurality of registers that are used to store single instruction, multiple data (SIMD) data, the first source data to include four round keys corresponding to four prior key expansion rounds of an SM4 cryptographic algorithm;
   receive a second source data including four key generation constants from a second register of the plurality of registers;
   generate a result that is to include four round keys corresponding to four sequential key expansion rounds of the SM4 cryptographic algorithm that sequentially follow the four prior key expansion rounds, wherein each of the four round keys is generated to be consistent with an evaluation of a key expansion linear substitution function with a value for the corresponding key expansion round, which is equal to the value logically XOR'd with the value rotated left by thirteen bits logically XOR'd with the value rotated left by twenty-three bits; and
   store the result in a destination register of the plurality of registers.

33. The article of manufacture of claim 32, wherein the instructions further comprise instructions that, if executed by the machine, are to cause the machine to perform operations comprising to receive a first key generation constant for a fourth most recent of the four prior key expansion rounds from bits [31:0] of the second register, receive a second key generation constant for a third most recent of the four prior key expansion rounds from bits [63:32] of the second register, receive a third key generation constant for a second most recent of the four prior key expansion rounds from bits [95:64] of the second register, receive a fourth key generation constant for a most recent of the four prior key expansion rounds from bits [127:96] of the second register, store a fifth round key for a fourth most recent of the four sequential key expansion rounds in bits [31:0] of the destination register, store a sixth round key for a third most recent of the four sequential key expansion rounds in bits [63:32] of the destination register, store a seventh round key for a second most recent of the four sequential key expansion rounds in bits [95:64] of the destination register, and store an eighth round key for a most recent of the four sequential key expansion rounds in bits [127:96] of the destination register.

* * * * *